United States Patent [19]
Gromley et al.

[11] Patent Number: 6,146,057
[45] Date of Patent: Nov. 14, 2000

[54] PNEUMATIC TRANSFER APPARATUS

[75] Inventors: Neil C. Gromley, Kensington; Robert J. Beck, North Canton; Robert J. Klatt, Canal Fulton; Allan R. Bakerink, New Philadelphia; Larry R. Gallagher, North Canton; Vincent T. Marmon, Canal Fulton, all of Ohio

[73] Assignee: Diebold, Incorporated, North Canton, Ohio

[21] Appl. No.: 09/104,579

[22] Filed: Jun. 25, 1998

[51] Int. Cl.⁷ ..................................................... B65G 51/32
[52] U.S. Cl. ........................... 406/10; 406/111; 406/186; 406/34; 406/51; 406/4; 406/37
[58] Field of Search .............................. 406/10, 111, 186, 406/34, 51, 4, 37; 222/61

[56] References Cited

U.S. PATENT DOCUMENTS

| | | |
|---|---|---|
| 920,045 | 4/1909 | Pearsall . |
| 1,745,786 | 4/1930 | Drenkard, Jr. . |
| 1,898,860 | 2/1933 | Underwood et al. . |
| 3,080,136 | 3/1963 | Kelley et al. . |
| 3,189,297 | 6/1965 | Ellithorpe . |
| 4,465,410 | 8/1984 | Vogel et al. ............................. 406/111 |
| 4,620,577 | 11/1986 | Nordenswan ........................... 406/111 |
| 5,131,792 | 7/1992 | Grosswiller et al. ................... 406/112 |

*Primary Examiner*—Christopher P. Ellis
*Assistant Examiner*—Jeffrey A. Shapiro
*Attorney, Agent, or Firm*—Ralph E. Jocke; Daniel D. Wasil

[57] ABSTRACT

A pneumatic transfer apparatus (10) includes a service provider terminal (22) and a customer terminal (24). A carrier (32) is moved through a transfer conduit (26) between the customer and service provider terminals by a differential pressure generating mechanism (28, 30). Each of the customer and service provider terminals includes an actuator mechanism (54, 82). The actuator mechanism is operative to orient an opening in the housing of the carrier with a transfer opening in the transfer conduit. The actuator mechanism is further operative to move an inner shell (100) relative to an outer shell (96) of the carrier so as to bring openings in said inner and outer shells into alignment which enables accessing the interior area of the carrier.

39 Claims, 22 Drawing Sheets

PNEUMATIC TRANSFER APPARATUS

TECHNICAL FIELD

This invention relates to devices and systems for transporting items from one location to another. Specifically, this invention relates to a pneumatic transfer apparatus and system which are used for transporting items such as medications and related articles such as prescriptions and payments, between a service provider station and a customer station.

BACKGROUND ART

Systems which transport items between stations are known in the prior art. Some prior art transfer systems include systems in which items are moved between a service provider and a customer in a carrier that is moved through a transfer conduit. The carrier is moved through the transfer conduit by differential pressure that is selectively produced in areas of the conduit. The differential pressure is commonly produced by drawing a vacuum in the area into which the carrier is to be moved, or by producing a positive pressure in the area behind the carrier, or both. In either event the differential pressure between the areas in front and behind the carrier propels it through the transfer conduit. Systems of this type are commonly provided in drive through banking applications by Diebold, Incorporated, the Assignee of the present invention. An example of such a system is shown in U.S. Pat. No. 5,299,891, the disclosure of which is incorporated herein by reference.

In prior art pneumatic transfer systems the carriers that are used to move items between the service provider and the customer are of a relatively small size. This is required to keep the systems economical and reliable. The movement of substantially larger carriers through transfer conduits of significant distance generally requires much larger blowers and more complex service provider and customer stations than is mechanically and economically feasible.

Pneumatic transfer systems are also generally made so that the service provider and the customer may remove the carrier for loading and unloading. This is desirable because the orientation of the carrier in such systems cannot be controlled. By removing the carrier from the conduit, the service provider and customer are enabled to manipulate the orientation of an access device on the carrier to facilitate loading and unloading items therefrom. The size and weight of removable carriers must be maintained relatively small so that all persons in reasonably good physical condition can remove, manipulate and reinstall the carrier in the transfer conduit.

It is common in removable carrier systems to include mechanisms which customers and service providers manipulate to access the interior area of the carrier. Errors can occur. This can cause the carrier to open during transport. This may result in loss of the contents of the carrier. The carrier may also become stuck in the tube disabling the system. Loose items within the tube may also cause damage to the accelerator rings, which are seals which extend between the carrier and the inside wall of the tube. These seals enable the carrier to move in response to differential pressure in the tube.

Some carrier designs are configured so that when the carrier is open it is larger in cross section than the inner cross section of the tube. If such a carrier is not properly closed and/or it opens in the tube during travel the carrier may become jammed in the tube. Freeing a jammed carrier may be time consuming and costly. Customers are inconvenienced until the system is fixed. The customer whose material is held in the jammed carrier is particularly inconvenienced.

In some situations it would be desirable to move items which are larger in size and/or which weigh more than items that are readily transferred using conventional pneumatic tube systems. One situation where such a need arises is in a drive through pharmacy. Many individuals would prefer to pick up and pay for prescriptions and medications from their car. However, the weight and physical size associated with the transport of relatively large quantities of medical items (which quantities are usually the most cost effective to purchase) makes conventional pneumatic tube systems unsuitable for this use. In addition, most persons would find it difficult to manipulate the carriers due to the larger size and weight.

Thus, there exists a need for a pneumatic transfer apparatus and method that can be used for delivering items which are of greater size and weight than items which are conventionally transferred in pneumatic tube systems, and which apparatus may still be economically installed and operated.

DISCLOSURE OF INVENTION

It is an object of the present invention to provide a pneumatic transfer apparatus for transporting items between a first station and a second station.

It is a further object of the present invention to provide a pneumatic transfer apparatus for transporting items of relatively large size and weight between a first station and a second station.

It is a further object of the present invention to provide a pneumatic transfer apparatus for transporting items in a manner which delivers the items in a desired orientation.

It is a further object of the present invention to provide a pneumatic transfer apparatus for transporting items which transports items rapidly and which minimizes the risk of damage during transport.

It is a further object of the present invention to provide a pneumatic transfer apparatus for transporting items which includes a carrier which has a relatively larger volume and weight carrying capacity.

It is a further object of the present invention to provide a pneumatic transfer apparatus which includes a carrier which provides more ready access to its interior area.

It is a further object of the present invention to provide a pneumatic transfer apparatus which includes a carrier which is enclosed to secure items therein during transport and which is readily accessed by a customer or a service provider.

It is a further object of the present invention to provide a pneumatic transfer apparatus for transporting items which includes a carrier and which has an actuating mechanism which orients the carrier to a desired delivery position when the carrier reaches a customer or service provider station.

It is a further object of the present invention to provide a pneumatic transfer apparatus for transporting items which is reliable and economical.

Further objects of the present invention will be made apparent in the following Best Modes for Carrying Out Invention and the appended claims.

The foregoing objects are accomplished in one preferred form of the invention by a pneumatic transfer apparatus which includes a transfer conduit. The transfer conduit extends between a service provider station and a customer station. A differential pressure generating mechanism is connected to the conduit so as to selectively provide a lower pressure in the conduit adjacent to either the service provider station or the customer station.

A carrier is movably positioned in the transfer conduit. The carrier is movable in response to differential pressure between the service provider station and the customer station. The carrier includes a housing which bounds an interior area of the carrier. The housing includes an opening therethrough to the interior area. A movable member is mounted on the carrier. The movable member is mounted so that it can be selectively moved between positions opening and closing the housing opening.

An actuating mechanism is provided at each of the service provider station and the customer station in the system. The actuating mechanism operates after the carrier arrives at the respective station to orient the carrier so that the opening in the housing is in aligned relation with an opening in the transfer conduit. The actuating mechanism further operates to move the movable member to open the interior area so that the items therein may be accessed by a service provider or customer adjacent to the respective station.

The system further operates in response to receipt of a command to transfer the carrier to the other of the service provider or customer station. The actuating mechanism operates to close the carrier to secure items therein before a differential pressure is produced in the transfer conduit to transfer the carrier towards the other station. This minimizes the risk of a malfunction. The service provider and customer station further include controlled sealing devices for controlling the release of pressure and the speed of the carrier as it arrives at the station. The controlled sealing devices also enable the rapid development of differential pressure when the carrier is desired to be moved away from the station. The actuating mechanism in each station includes a shock absorbing mounting to minimize wear due to repeated engagement with the carrier.

BEST MODES FOR CARRYING OUT INVENTION

Figure 1:
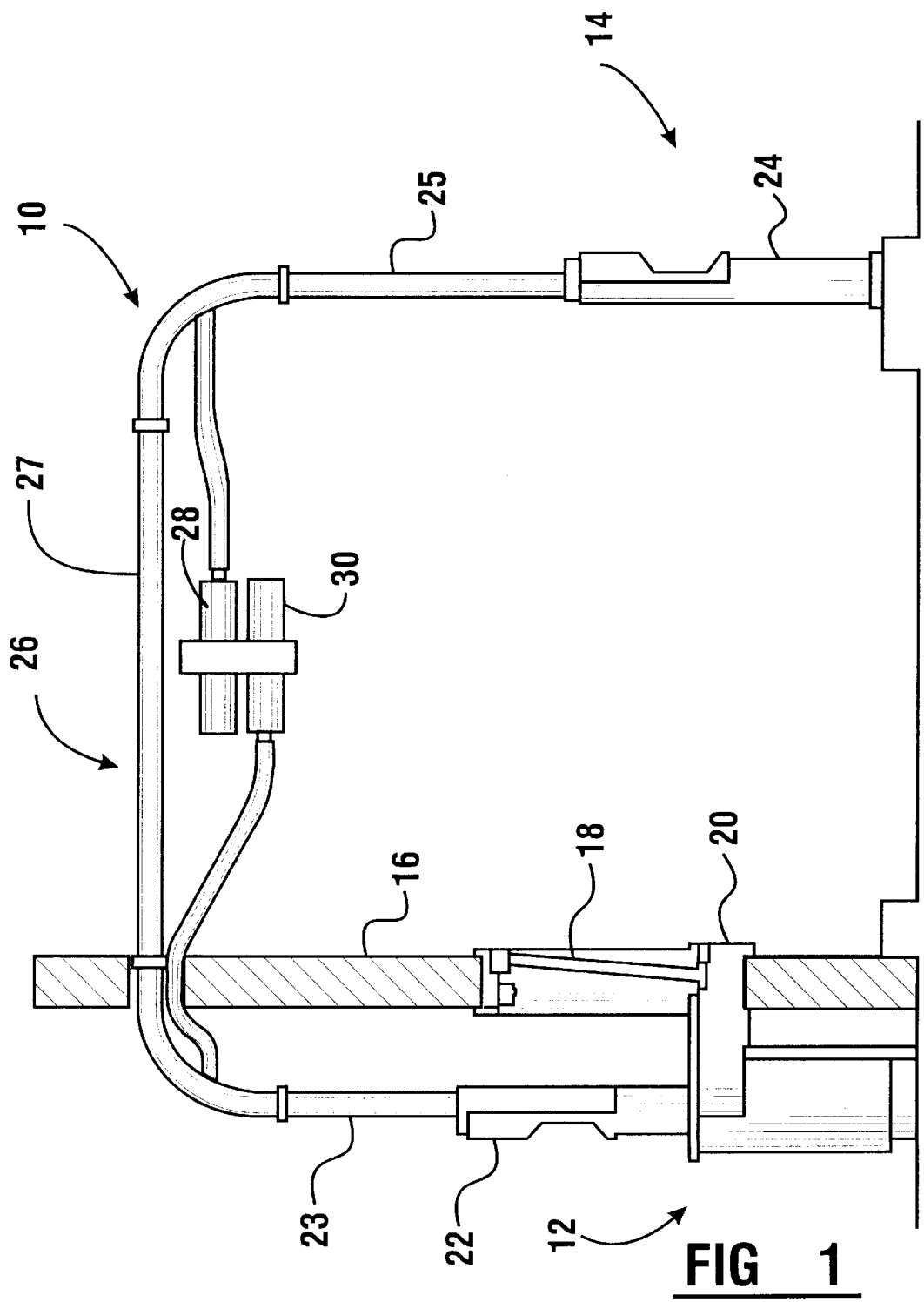
FIG. 1 is a schematic view of a pneumatic transfer apparatus of a preferred embodiment of the present invention.
Figure 3:
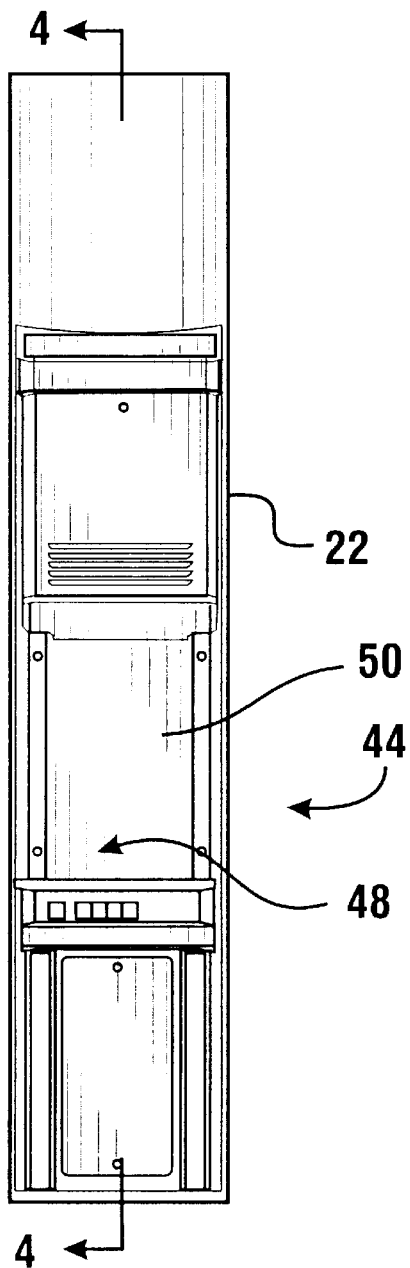
FIG. 3 is a front plan view of the service provider terminal shown in FIG. 2.
Figure 2:
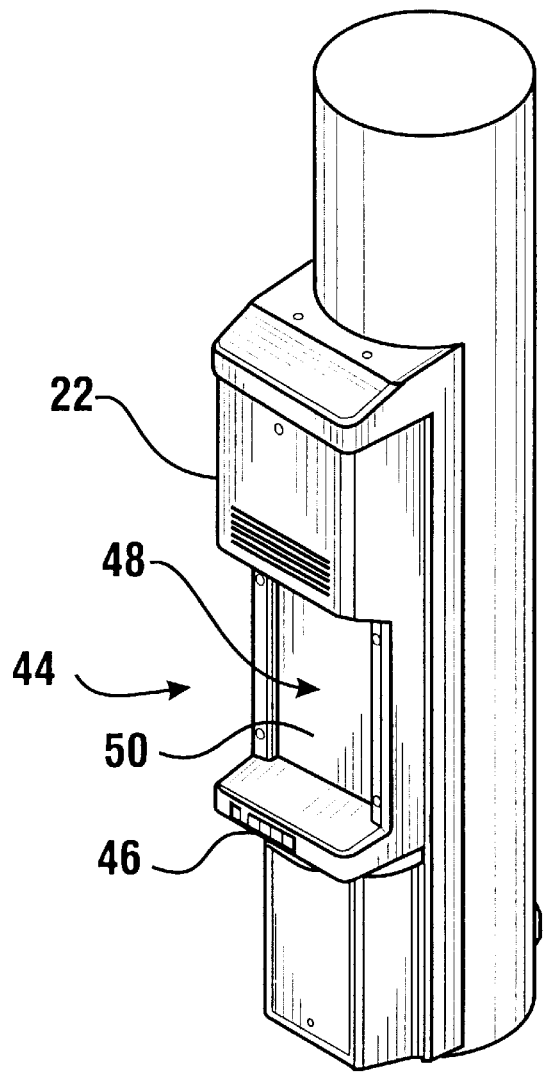
FIG. 2 is an isometric view of a service provider terminal of the system shown in FIG. 1.

Referring now to the drawings and particularly to FIG. 1, there is shown therein one preferred embodiment of the pneumatic transfer apparatus of the present invention generally indicated 10. The system 10 includes a service provider station 12 and a customer station 14. In the embodiment of the invention shown, the service provider station 12 is preferably operated by a pharmacist, cashier, or other personnel in a drug store, pharmacy or similar establishment. The customer station in the preferred embodiment is at a drive through or walk up location located outside the facility in which the pharmacy is operated. Of course, the present invention may be used in many other transaction environments as well, such as in banking, gaming, ticketing, vending and other sales or service facilities.

System 10 is installed through a building wall 16, which in the embodiment shown is an exterior building wall of a drugstore or other building which houses a pharmacy. Wall 16 has installed therein a drive through window 18 which enables a service provider such as a cashier or other personnel to observe customers at the customer station. The service provider station also includes a retractable drawer mechanism 20, which a service provider may selectively extend or retract to exchange items or documents with customers. Such drawer mechanisms are commercially available from Diebold, Incorporated, the Assignee of the present invention. In the embodiment of the system 10 shown in FIG. 1, the drawer mechanism 20 may be used to exchange items with a customer who is adjacent to window 18 either in a car or otherwise. The system of the invention may be concurrently used by a service provider at service provider station 12 to exchange items with a further customer at customer station 14. It should be understood however that in other embodiments of the invention other configurations for service provider and customer stations may be used.

The service provider station 12 includes a service provider terminal 22. Customer station 14 includes a customer terminal 24. Terminals 22 and 24 are connected by a transfer conduit 26. Transfer conduit 26 includes a first generally vertically extending leg portion 23 which is in communication with the service provider station 22. Transfer conduit 26 further includes a second generally vertically extending leg portion 25 which is in communication with the customer station 24. A transversely extending portion 27 extends generally horizontally between the first and second leg portions. The transverse portion 27 is connected to the leg portions through radiused bends in the conduit which are suitably radiused to enable the passage of the carrier therethrough in a manner which is later explained.

A first blower 28 is connected to transfer conduit 26 generally in the area above customer terminal 24. Blower 28 may be selectively operated in a manner later explained to draw a vacuum in the transfer conduit in the area generally above the customer terminal. Blower 28 further includes suitable valving so that when the blower 28 is not operated, air is generally prevented from entering the transfer conduit 26 through the blower 28. A blower 30 similar to blower 28 is connected to the transfer conduit in an area generally above service provider terminal 22. Blower 30 may be operated to selectively produce a vacuum in the transfer conduit above the service provider terminal. Like blower 28, when blower 30 is not operating air is generally prevented from entering the transfer conduit through the blower.

Figure 9:
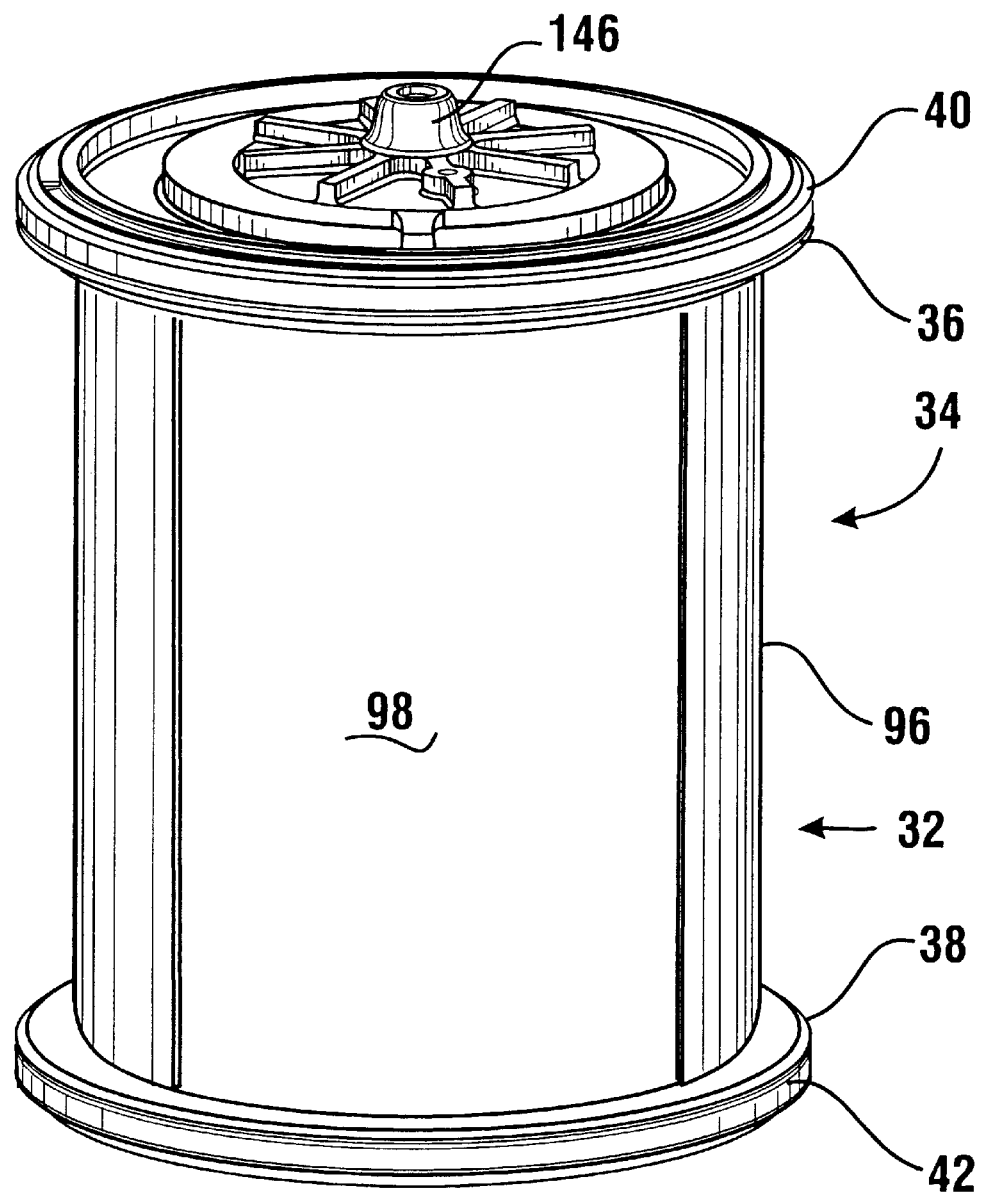
FIG. 9 is an isometric view of a carrier used in the embodiment of the invention shown in FIG. 1, the carrier being shown in a closed position.

In one preferred form of the invention, a carrier 32 of the type shown in FIG. 9 is enabled to be selectively moved between the service provider terminal and the customer terminal by the differential pressure produced by blowers 28 and 30. As shown in FIG. 9, carrier 32 includes a housing 34. The housing includes a first end member 36 and a second end member 38 which are later described in detail. First end member 36 has an annular, relatively resilient seal 40, which is also referred to herein as an accelerator ring, supported thereon. Likewise, second end member 38 has a seal 42 or accelerator ring supported thereon. The accelerator rings provide slidable and generally fluid tight engagement between the carrier housing and an interior wall of the transfer conduit. This enables the carrier to be moved in the transfer conduit by a differential pressure on opposite sides of the carrier 32.

The service provider station 12 is shown in greater detail in FIGS. 2 through 5. The exterior of the service provider station includes a service provider interface generally indicated 44. Interface 44 includes a control panel 46. Control panel 46 includes buttons and indicators which are used by a service provider to cause the carrier to move between the stations of the system, as well as to input other commands. In the preferred form of the invention the control panel 46 includes a button which may be actuated to transfer the carrier from the service provider station to the customer station. Another button included on the control panel may be actuated to move the carrier from the customer station to the service provider station.

The preferred form of the invention includes an audio interface which includes a microphone and speaker or comparable communication devices. This enables the service provider to audibly communicate with the customer through similar devices at the customer station. Buttons on the control panel 46 may be selectively actuated by the service provider and enable the service provider to speak to and/or listen to a customer at the customer station.

The control panel 46 of service provider station 12 may further include indicator lights or other devices for providing the service provider with information concerning the status of components in the system. In addition, alternative embodiments of the present invention may include additional devices for communicating with customers including audio and visual communication devices such as those shown in U.S. patent application Ser. No. 08/889,033 filed Jul. 7, 1997, which is owned by the Assignee of the present invention and which is incorporated herein by reference. In addition, the customer terminal may be similar to that shown in U.S. Ser. No. 08/889,033 and may include the devices for communication between a customer and a service provider shown therein.

The service provider terminal 22 further includes a transfer opening 48. The transfer opening 48 extends through the transfer conduit and enables access to the carrier 32. The service provider is enabled to place items to be transferred to a customer into an interior area of the carrier when the carrier is positioned at the service provider station. In one preferred form of the invention the items to be transferred commonly include medical items, instruction booklets, currency and coins, credit card vouchers, receipts and prescriptions aid other documents and things that could reasonably be expected to be exchanged in a transaction related to the purchase of medical items. In this one preferred form of the invention the carrier 32 preferably has a diameter of about eight to ten inches, and a height sufficiently large so as to enable carrying the desired types and quantities of items. When the invention is used in other types of transaction environments, other items may be transferred in the carrier and other sizes and configurations of the carrier, tube and terminals may be used.

Figure 4:
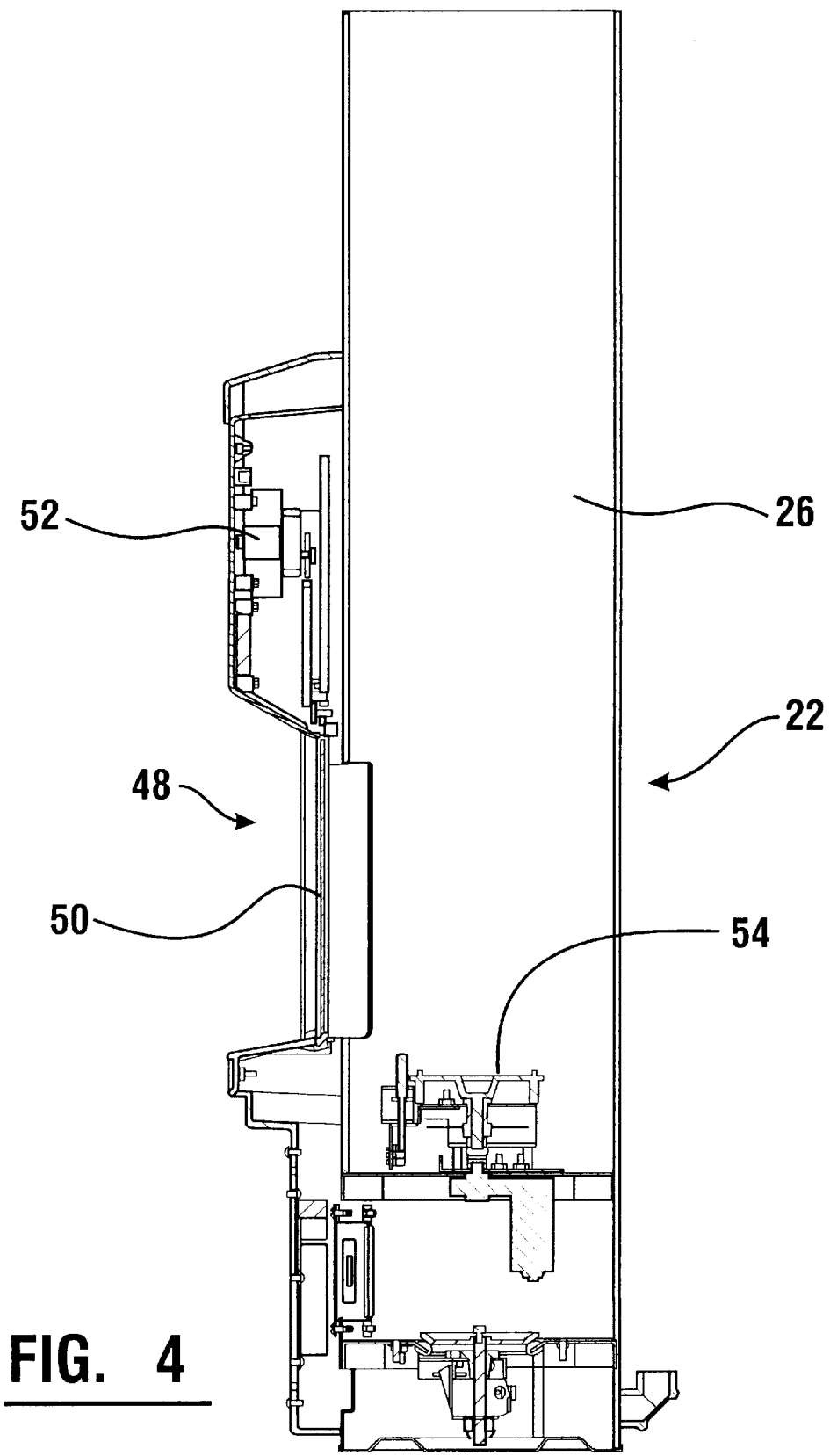
FIG. 4 is a cross sectional view of the service provider terminal along line 4—4 in FIG. 3.
Figure 5:
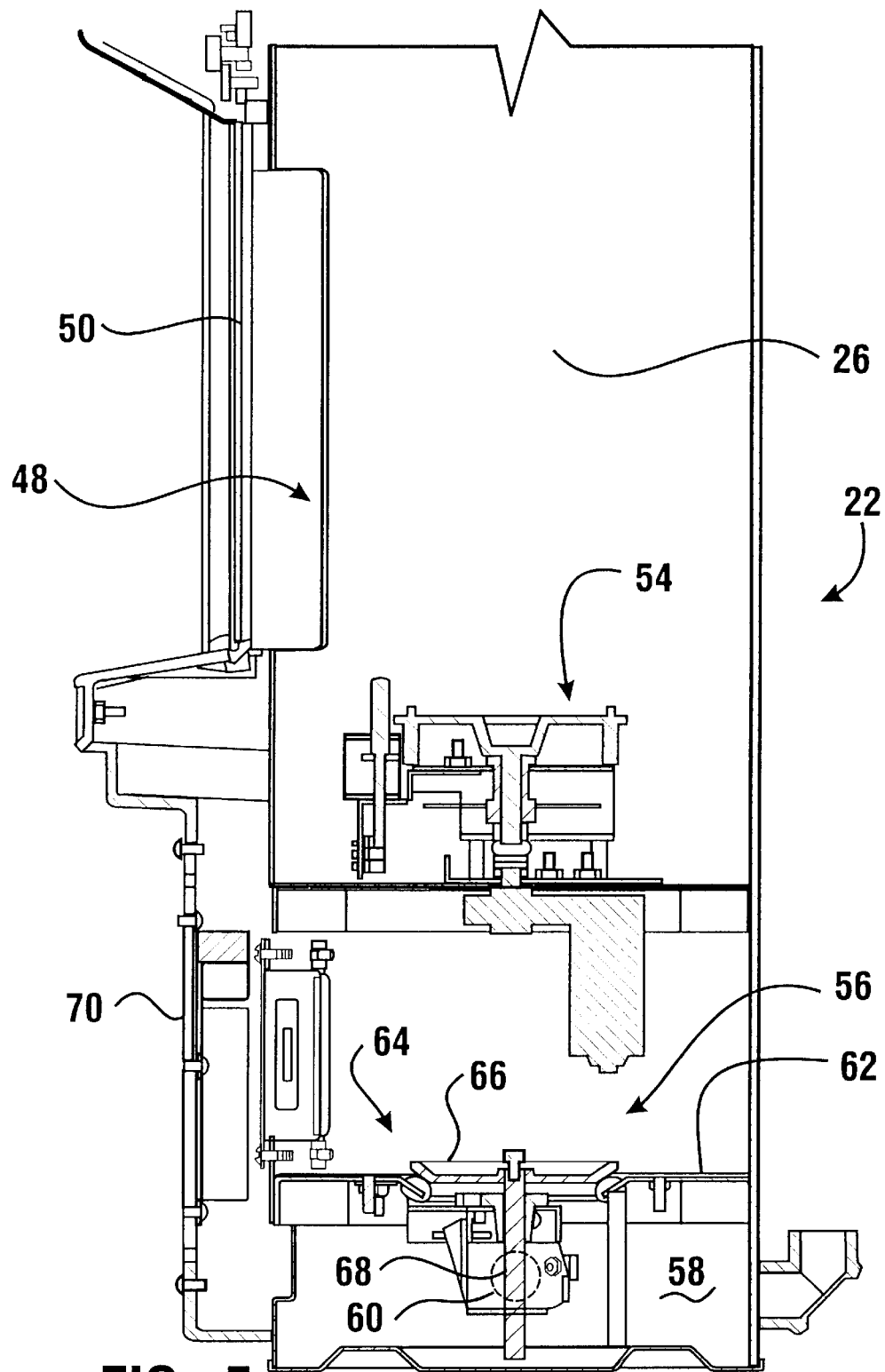
FIG. 5 is an enlarged view of the actuating mechanism for positioning and opening a carrier, and an air control valve mechanism of the service provider terminal.

The transfer opening 48 of the embodiment shown preferably includes a door 50. As best shown in FIG. 4, door 50 is preferably a sliding-type door that is movable up and down so as to selectively cover or enable access to the carrier through transfer opening 48. Door 50 is moved between its respective positions by a door moving mechanism 52. The door moving mechanism for door 50 is preferably similar to that shown in U.S. Pat. No. 5,299,891, the disclosure of which is incorporated herein by reference. The door moving mechanism controls the opening and closing of door 50 at appropriate times under the control of the control circuitry of the system and in a manner that is later discussed in detail.

The service provider terminal 22 further preferably includes an actuator mechanism 54. The actuator mechanism 54 extends in the transfer conduit below the transfer opening 48. The actuator mechanism operates in a manner later described to orient the carrier after it arrives at the service provider station. After the carrier is oriented, the actuator mechanism further operates in the preferred embodiment to hold the carrier in the desired orientation as the carrier is opened so as to enable the service provider to access its interior area.

The service provider station 22 further includes an air valve mechanism 56. The air valve mechanism 56 operates to control the passage of air generally to and from the end of the transfer conduit 26. The air valve mechanism 56 separates the transfer conduit 26 from a lower chamber 58 which is connected to atmosphere through a fitting or other opening.

Lower chamber 58 is bounded by a dividing wall 62. The dividing wall 62 includes an opening 64 therethrough. The opening 64 is a generally upwardly tapered opening as shown and is bounded by a resilient seal. A disk valve member 66 is sized to generally close opening 64 when it is engaged with the seal. Disk valve 66 is mounted on a movable stem 68. Stem 68 is enabled to move upwardly in response to a solenoid actuator 60 or other actuator device so that disk valve member 66 is disposed from opening 64. The solenoid is actuated by a controller for the system when the blowers are operated so that pressure in conduit transfer 26 is less than the atmospheric pressure in lower chamber 58. When the valve member is open, a carrier may move away from the service provider station due to the differential pressure.

In the closed position of disk valve member 66, air is generally not able to pass between the transfer conduit and atmosphere through the valve. Sealing off the end of the transfer conduit creates an air pocket between a carrier in the vertical leg 23 above the service provider terminal, and the closed valve. This air pocket provides a cushion for a descending carrier. The accelerator rings on the carrier control the rate of air flow past the carrier out of the air pocket. The rate of flow determines the speed at which the carrier 32 may fall by the force of gravity toward the service provider station and controls the speed at which the carrier engages the actuator mechanism 54. However as can be appreciated, when it is desired to move the carrier by differential pressure away from the service provider station, valve disk member 66 is opened so as to enable atmospheric pressure to be applied behind the carrier to move it in the transfer conduit. In other embodiments other appropriate air escape mechanisms may be used to control the rate of air flow out of the vertical leg below a descending carrier.

The service provider terminal 22 further includes an access door 70 which is selectively removable to enable accessing the actuator mechanism 54, the air valve mechanism 56 and electrical circuitry and other components that are housed in the service provider terminal. Of course, the service provider terminal may also include additional features and apparatus therein or operatively connected thereto such as those discussed in connection with U.S. patent application Ser. No. 08/889,033 filed Jul. 7, 1997 and/or U.S. Pat. No. 5,299,891, the disclosures of which are incorporated herein.

Figure 6:
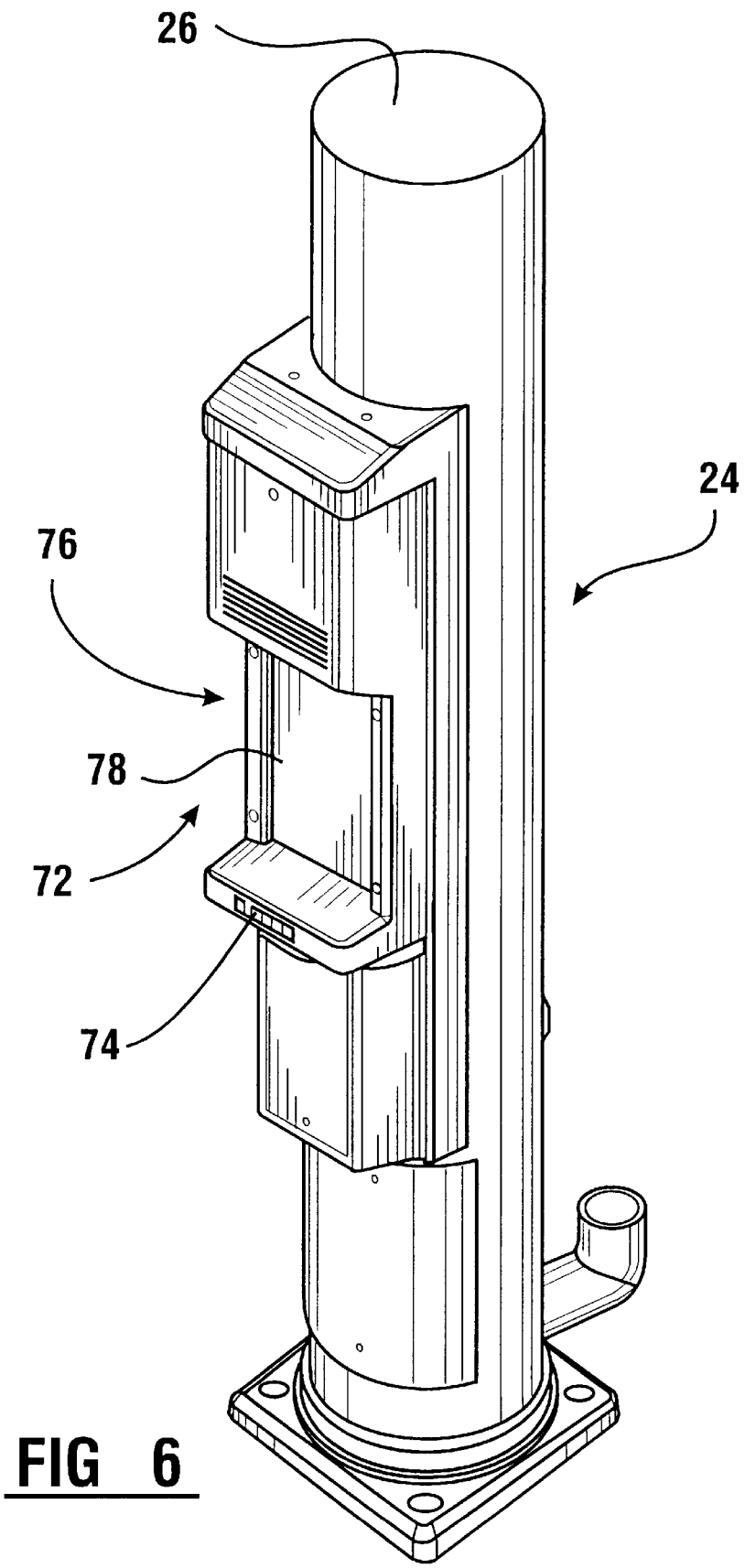
FIG. 6 is an isometric view of a customer terminal of the system shown in FIG. 1.
Figure 7:
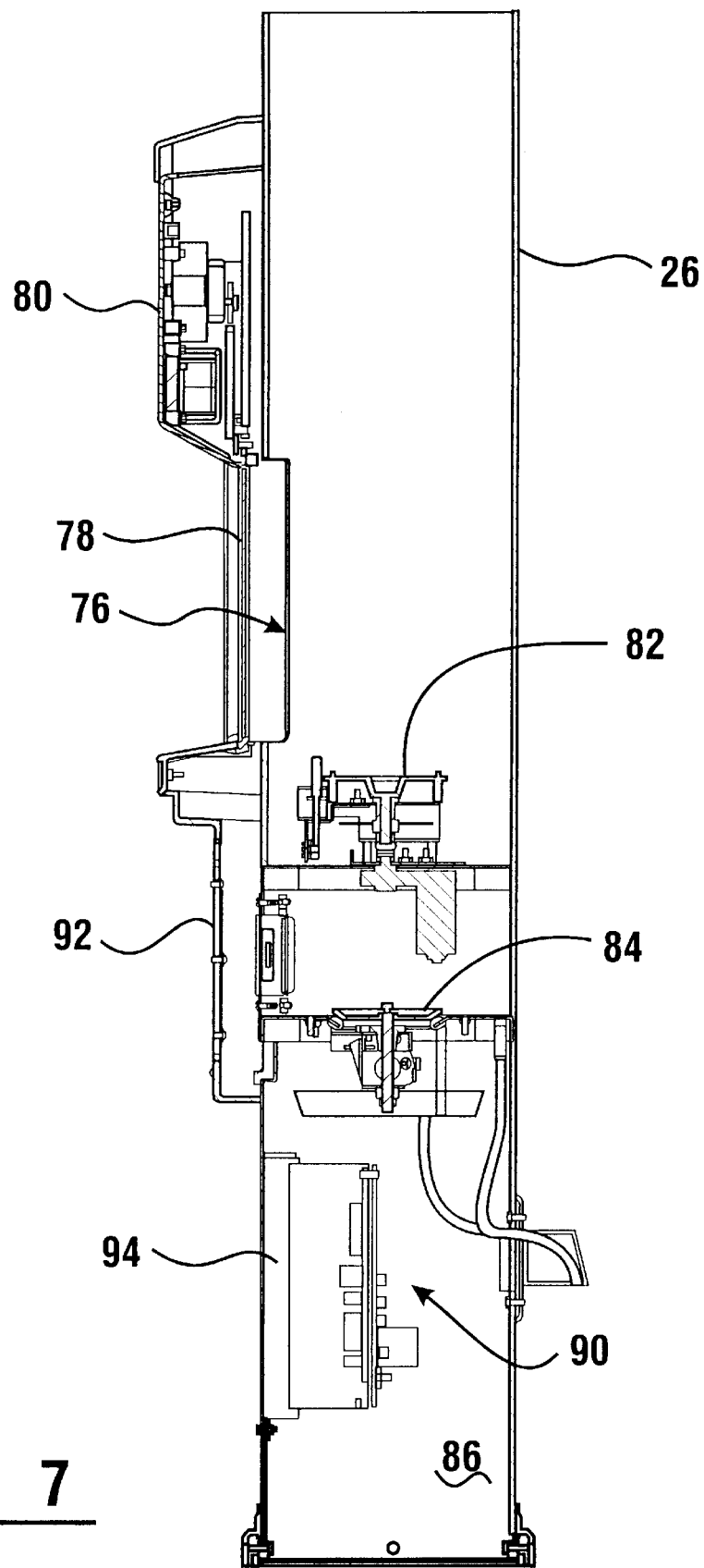
FIG. 7 is a cross sectional view of the customer terminal shown in FIG. 6.
Figure 8:
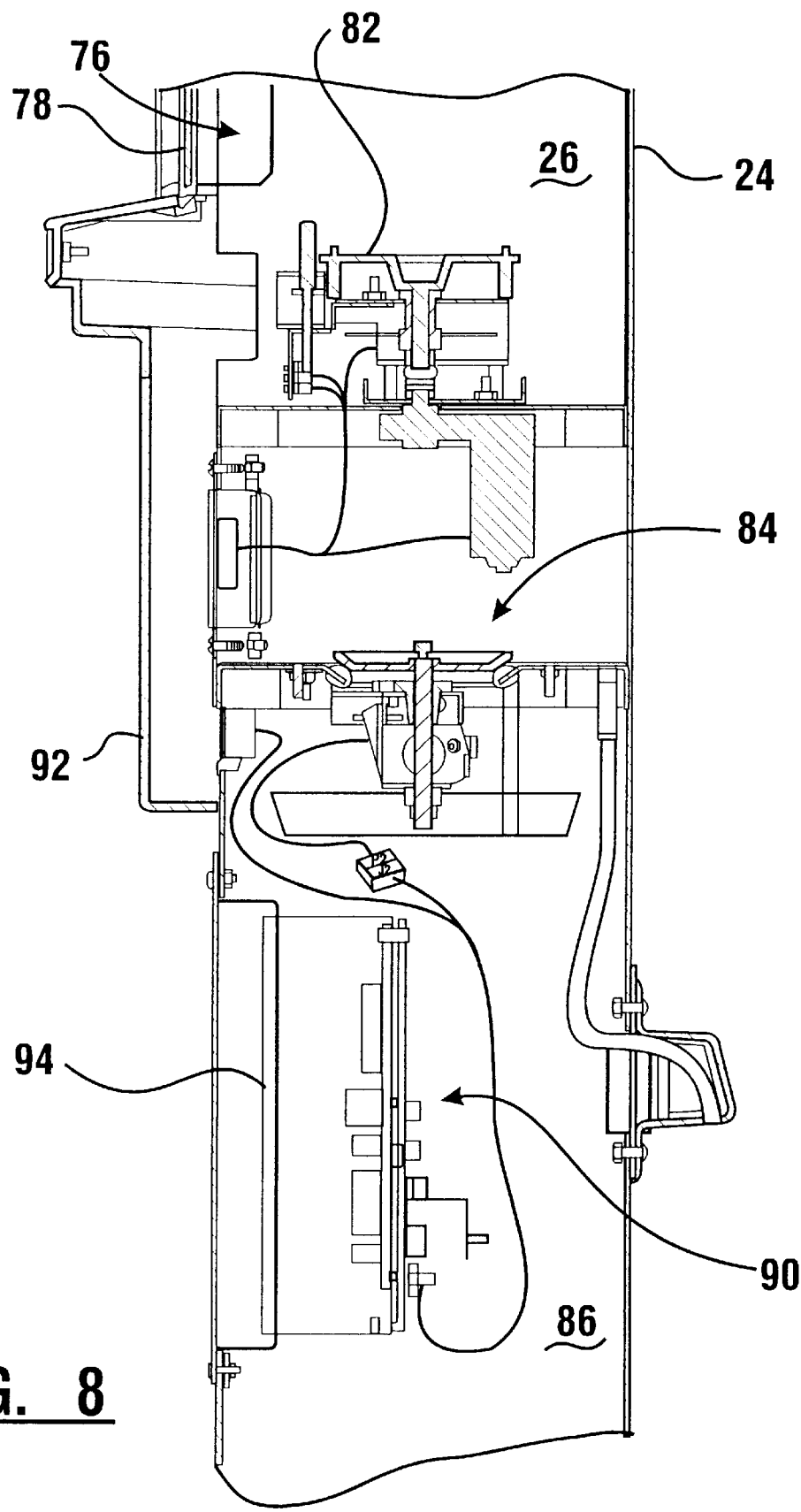
FIG. 8 is a cross sectional view showing the actuator mechanism for orienting and opening a carrier and an air valve mechanism in the customer terminal.

The customer terminal 24 is shown in greater detail in FIGS. 6 through 8. The customer terminal 24 includes an interface 72. The interface 72 includes a control panel 74. The control panel 74 is preferably simpler than the control panel of the service provider terminal. The control panel 74 preferably includes buttons which enable a customer to send a carrier from the customer terminal to the service provider terminal, as well as to signal a service provider at the service provider terminal. In addition, control panel 74 of the customer terminal may include indicators for indicating to the customer various conditions as to the status of the system.

Interface 72 of the customer terminal 24 also preferably includes a microphone and speaker mechanism or similar communication devices mounted within the housing of the customer terminal. This enables the customer to audibly communicate with the service provider. Alternative embodiments of the invention may include visual communication devices and other devices for communicating between a customer and a service provider, such as those described in the incorporated patent disclosures.

The customer terminal 24 includes a transfer opening 76. Transfer opening 76 extends through transfer conduit 26 in a manner similar to transfer opening 48 of the service provider terminal. Transfer opening 76 is selectively opened and closed by a door 78. Door 78 is preferably movable between positions opening and closing transfer opening 76 by a door moving mechanism 80. Door 78 and the door moving mechanism are preferably similar to that used in the service provider terminal.

Customer terminal 24 preferably includes an actuator mechanism 82. Actuator mechanism 82 is generally similar to actuator mechanism 54 of the service provider terminal and operates in a manner later described. Actuator mechanism 82 is mounted in the transfer conduit 26 below the transfer opening 76.

Customer terminal 24 further includes an air valve mechanism 84. Air valve mechanism 84 operates in a manner similar to air valve mechanism 56 of the service provider terminal. Air valve mechanism 84 controls air flow between the transfer conduit 26 and a lower chamber 86 of the customer station. Lower chamber 86 is in communication with atmosphere through a fitting or other opening. Drain lines and a catch pan are provided in the customer terminal for catching and safely draining water that may enter the interior of the terminal due to rain or snow.

As shown in FIG. 8, lower chamber 86 has mounted therein control circuitry generally indicated 90. The control circuitry comprises a controller which includes a processor, a memory and other electrical components for operating electrical components of the system in the manner later described. The various electrical components of the system are connected to the control circuitry through suitable electrical connectors. Removable access panels 92, 94 are provided on the customer terminal to enable access to the control circuitry and other components therein for servicing. It should be understood that while the control circuitry is shown positioned in the customer terminal, in other embodiments the control circuitry may be positioned in other suitable locations including within the service provider terminal or in a local or remote control panel. Further, while the control circuitry is shown as operating in a dedicated controller environment, other embodiments may employ a separate special purpose or general purpose computer which controls a plurality of different types of devices in response to programs operating therein. This may include devices and systems in addition to those associated with the invention. In such circumstances suitable interfaces may be provided for communicating with and controlling the various components in the system with the computer.

The carrier 32 which is moved between the service provider terminal 22 and the customer terminal 24 in one preferred form of the invention, is shown in greater detail in FIGS. 9 through 18. The carrier includes the housing 34 which is generally cylindrical and extends between the first end member 36 and the second end member 38 as shown in FIG. 9. The housing 34 includes a generally cylindrical outer shell 96. The outer shell includes an open arcuate portion 98 which defines an opening through the outer shell 96 to an interior area of the carrier. The outer shell 96 is mounted in relatively fixed relation to the end members 36 and 38.

Figure 18:
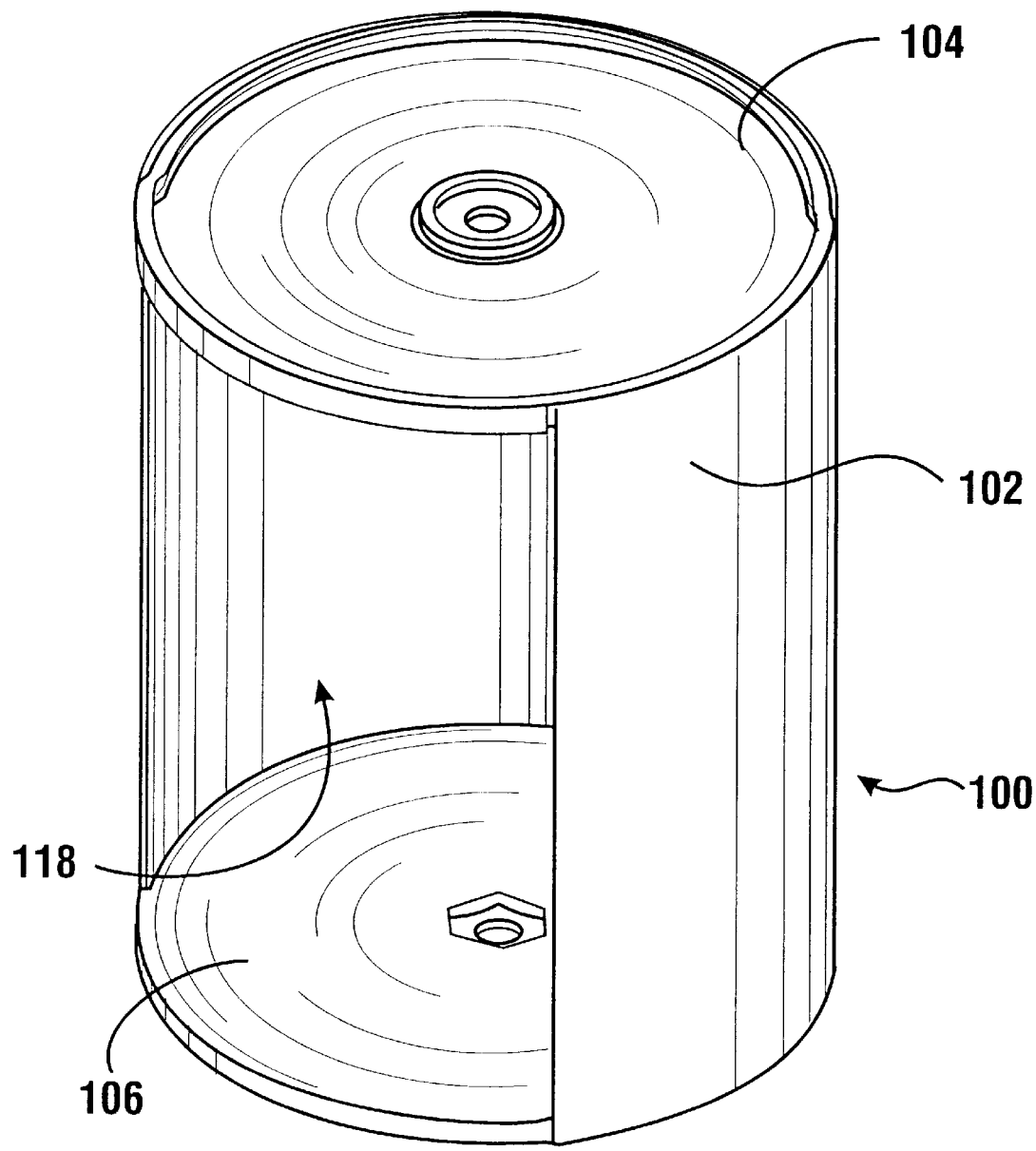
FIG. 18 is an isometric view of the inner shell of the carrier of the preferred embodiment with first and second inner cap members thereon.

Carrier 32 further includes a generally cylindrical inner shell 100. Inner shell 100 is positioned in concentric relation inside the outer shell and is sized to be in close fitting but movable relation relative to the outer shell. As shown in FIG. 18, inner shell 100 includes an arcuate wall member 102. A first inner top cap 104 is positioned at a first end of the arcuate wall member 102. A second inner top cap 106 is positioned at an opposed end of the arcuate wall member of the inner shell.

Figure 16:
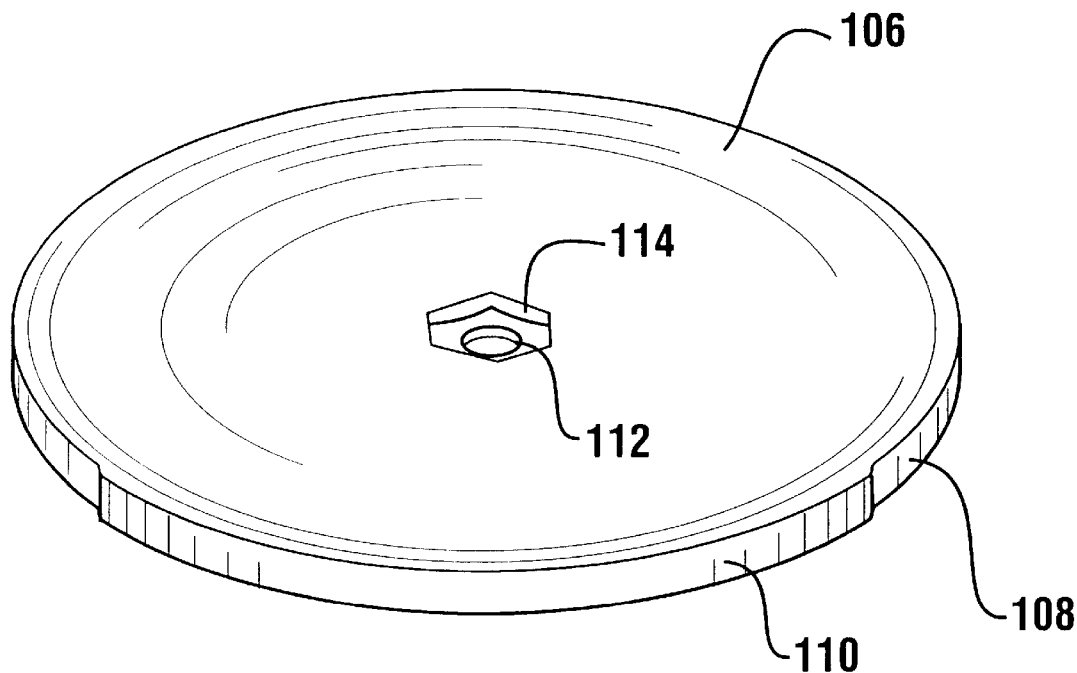
FIG. 16 is a top isometric view of an inner cap member of the carrier shown separated from the inner shell.
Figure 17:
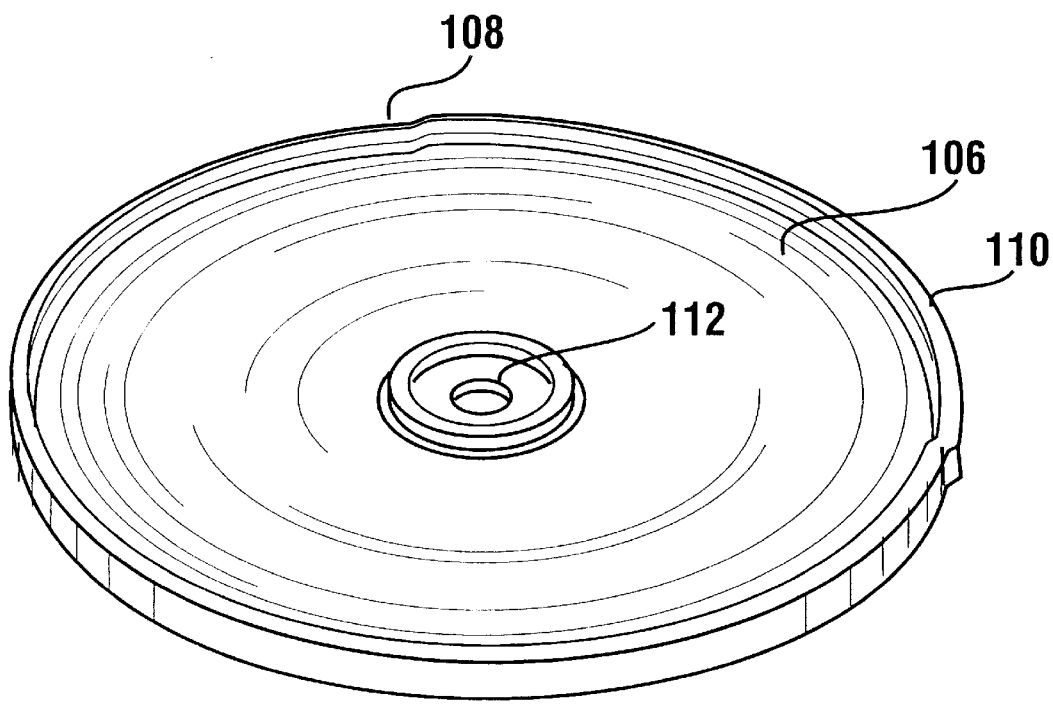
FIG. 17 is a top isometric view of the inner cap member.

The first and second inner top caps of one preferred form of the carrier are identical and are as shown in FIGS. 16 and 17, in which inner top cap 106 is shown. As shown in FIGS.

16 and 17, the top caps include an arcuate recessed portion 108 and an arcuate projecting portion 110. The depth of recessed portion 108 is such that when the arcuate wall 102 is positioned therein, the inner shell 100 presents a generally uniform outer diameter. This outer diameter is generally consistent all the way along the inner shell and is sized to enable the inner shell to rotate relative to the outer shell.

Figure 10:
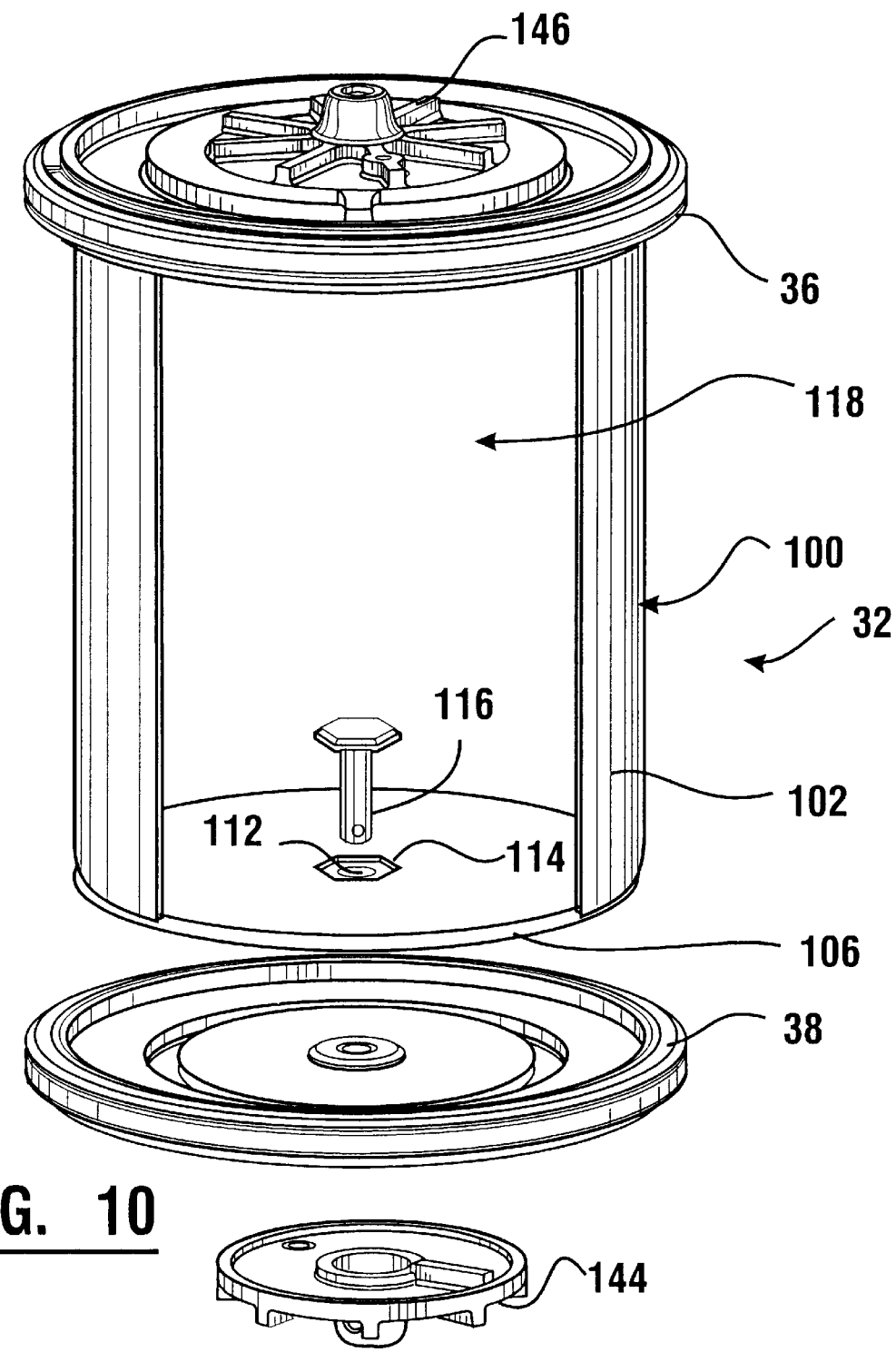
FIG. 10 is a partially exploded isometric view of the inner shell, end member and outer cap member of the carrier.

As shown in FIGS. 16 and 17, the top caps include an opening 112 therethrough. The inner surface of each top cap includes a hexagonal recess 114 in surrounding relation of the opening 112. As shown in FIG. 10, hexagonal recess 114 is configured to accept the hexagonal head of a transfer shaft member 116 in nested relation therein. Transfer shaft member 116 enables imparting relative rotational movement to the inner shell 100 by the actuator mechanisms in a manner which is later discussed.

As shown in FIG. 18 and FIG. 10, inner shell 100 includes an opening 118 which generally corresponds to the arcuate opening 98 in the outer shell 96. As a result, when the opening 118 in the inner shell is moved into aligned relation with the arcuate opening 98 in the outer shell, an interior area of the carrier is enabled to be accessed. As a result, items to be transported within the interior area of the carrier are enabled to be closed in the housing of the carrier by moving the inner shell 100 so that its arcuate wall 102 blocks the opening 98 in the outer shell. When it is desired to access the items in the interior area, the inner shell which comprises a movable member, is moved so as to bring the opening in the inner shell and the opening in the outer shell into alignment. It should be understood that while in the preferred embodiment of the invention a concentric inner shell serves as a movable member for selectively opening and closing the opening of the carrier, in other embodiments of the invention other movable members which move relative to the housing of the carrier may be used.

The carrier 32 is bounded at each end by end members 36 and 38. In the preferred form of the invention the end members are identical. The end members are shown in greater detail in FIGS. 12 and 13.

Figure 12:
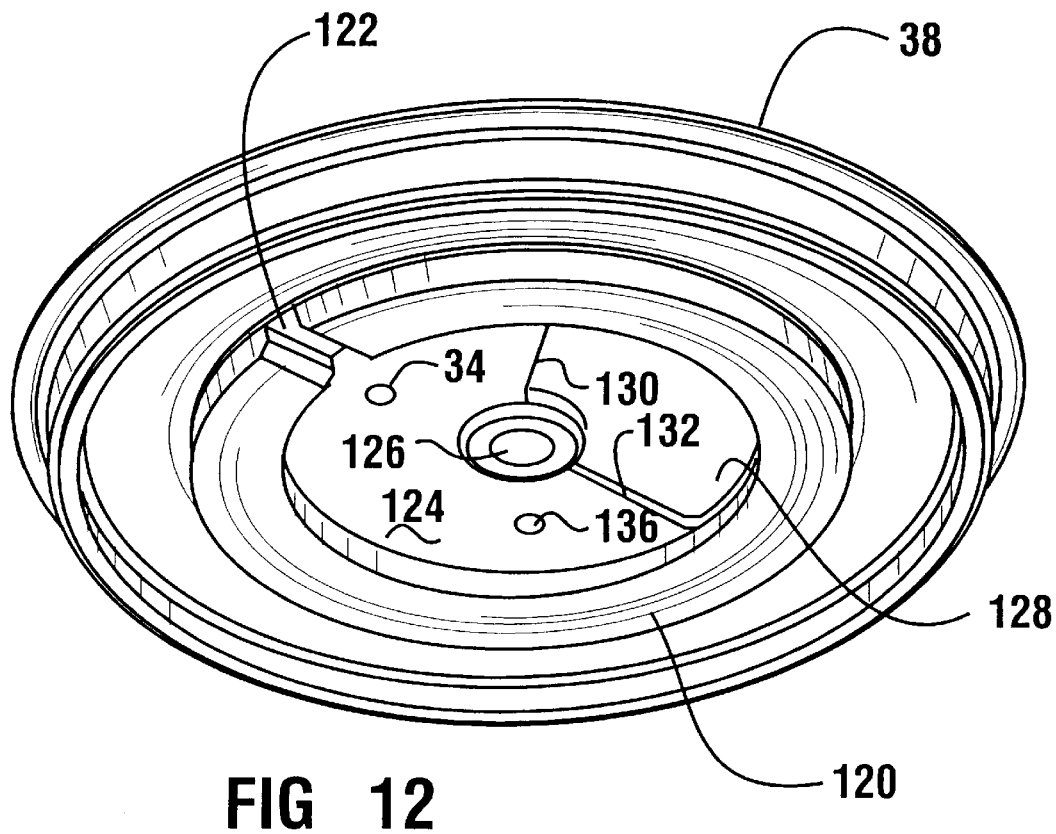
FIG. 12 is a bottom isometric view of an end member of the carrier.

FIG. 12 shows a bottom isometric view of end member 38. End member 38 includes a generally annular projection 120 which extends in axially centered relation thereon. Annular projection 120 includes a recess or notch 122 thereon. Recess 122 is preferably positioned at a predetermined angular location relative to the openings in the outer shell 96 of the carrier.

Annular projection 120 bounds a generally circular surface 124 and opening 126 extends through end member 38 in axially centered relation on surface 124. Surface 124 further includes an arcuate aperture 128. Aperture 128 is bounded by an aperture wall including a first generally radially extending surface 130 and a second generally radially extending surface 132. Aperture 128 in the embodiment shown, does not extend entirely through end member 38. However, in other embodiments of the invention the end member may have such construction.

Surface 124 further includes thereon a first circular recess 134, and a second circular recess 136 angularly disposed from circular recess 134. The angular displacement between recesses 134 and 136 generally corresponds to the angular displacement between surfaces 130 and 132 bounding aperture 128. This angular displacement generally corresponds to the relative angular displacement of inner shell 100 relative to outer shell 96 that is required to bring the openings of the inner shell and the outer shell from a closed to an open position.

Figure 11:
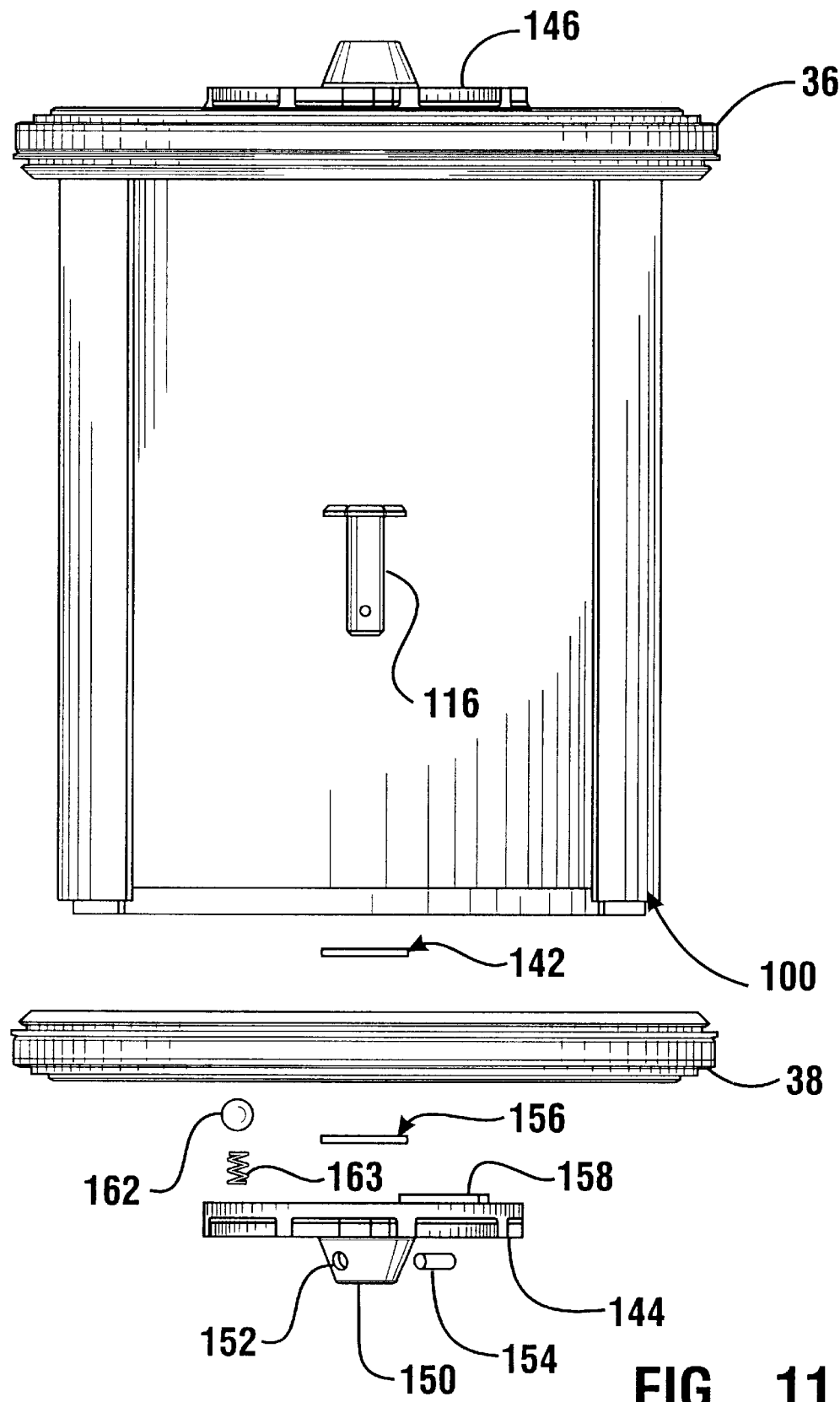
FIG. 11 is a front plan exploded view of the inner shell member, end member and outer cap member of the carrier.
Figure 13:
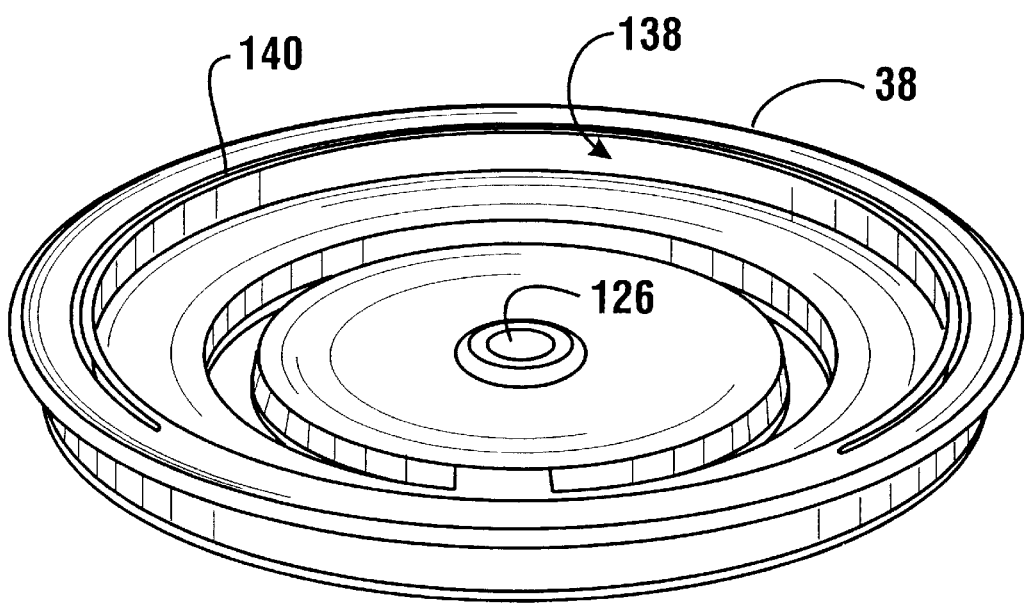
FIG. 13 is a top isometric view of the end member shown in FIG. 12.

The inner surface of end member 38 is shown in greater detail in FIG. 13. Opening 126 extends through the inner surface. Opening 126 is sized to enable transfer shaft member 116 to rotate therein. The inner surface of end member 38 includes a cylindrical recess 138. Cylindrical recess 138 is sized to enable the inner shell 100 to rotate therein. The inner surface of end member 38 also includes an arcuate slot 140. Arcuate slot 140 accepts the arcuate wall of the outer shell therein in nested relation. The outer shell is held in relative fixed relation to both of the end members 36 and 38, while the inner shell 100 is movable relative thereto. As shown in FIG. 11, a washer 142 or other suitable bearing means is provided to facilitate relative movement between the inner shell 100 and each of the end members.

Each end of carrier 32 has an outer cap member thereon. An outer cap member 144 is mounted adjacent to end member 38. Likewise, an outer cap member 146 is mounted adjacent to end member 36. In one preferred form of the invention the outer cap members 144 and 146 are identical as are the end members 36 and 38. For this reason, only one outer cap member and its relationship with an adjacent end member will be described.

Figure 15:
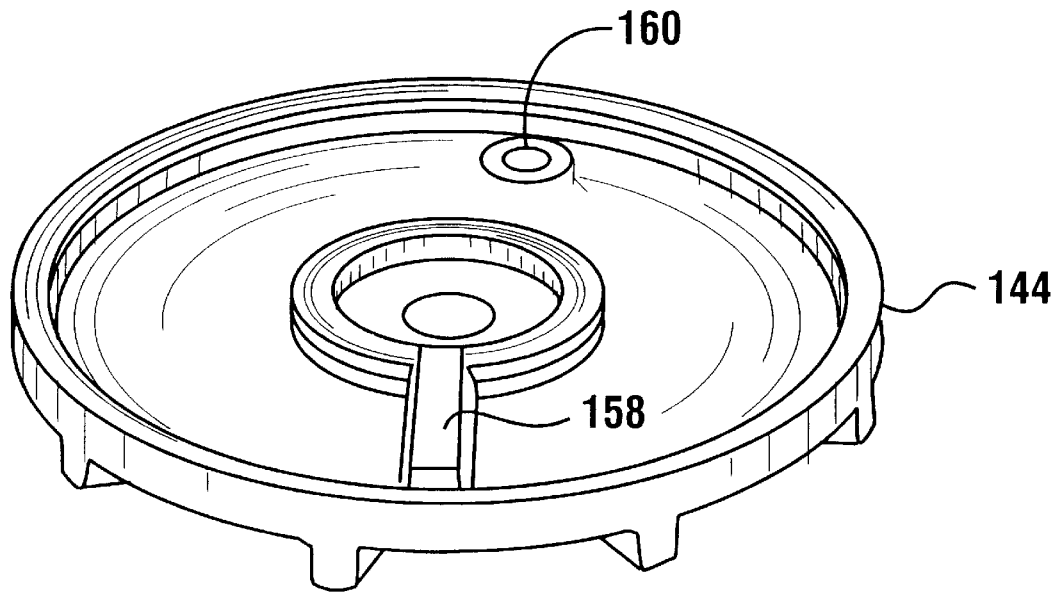
FIG. 15 is a top isometric view of the outer cap member shown in FIG. 14.
Figure 14:
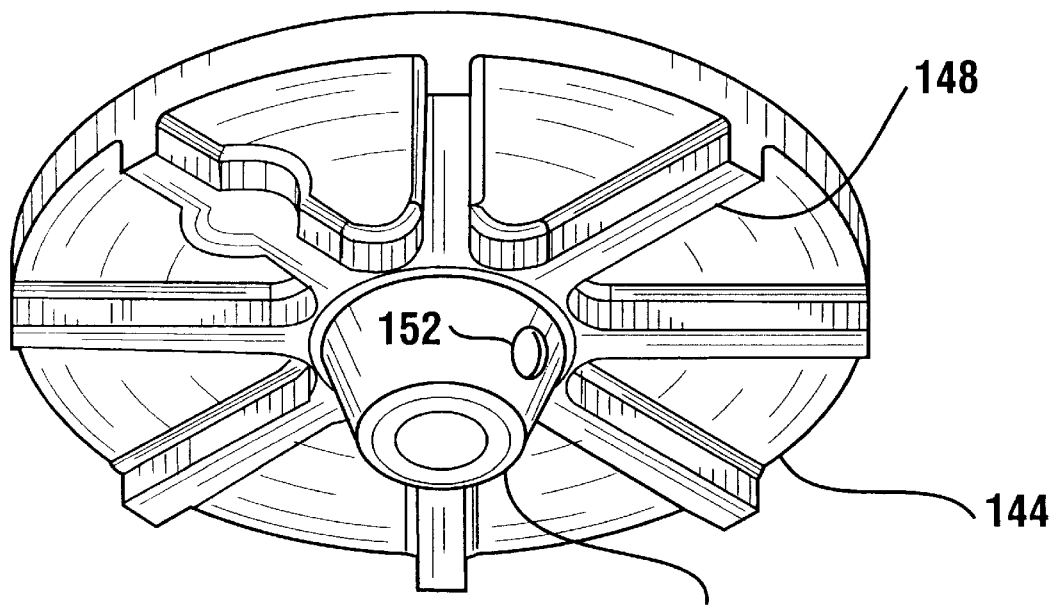
FIG. 14 is a bottom isometric view of the outer cap member of the carrier.

Outer cap member 144 is shown in greater detail in FIGS. 14 and 15. Outer cap member 144 includes a plurality of axially and radially extending projections 148 extending on an outer surface thereof. Projections 148 extend from a central hub area 150 as shown in FIG. 11. Hub area 150 is sized to accept the outer end of transfer shaft member 116 therein. Hub area 150 also includes an opening 152 into which a pin 154 is accepted. Pin 154 operates to hold outer cap member 144 and inner shell 100 in relatively fixed engagement. A washer 156 or other suitable bearing means is provided so as to facilitate relative rotational movement between the outer cap member 144 and the end member 38.

As shown in FIG. 15, outer cap member 144 includes a stop finger 158. Stop finger 158 extends in the preferred embodiment both axially inward and radially outward on an interior surface of cap member 144. Stop finger 158 is sized to be accepted into aperture 128 on adjacent end member 38. Stop finger 158 is also configured so as to engage surfaces 130 and 132. The engagement of the stop finger and the surfaces bounding aperture 128 of the end member 38 serve to limit the extremes of relative rotational movement between the end member 144 (and the inner shell 100 connected thereto) relative to the end members of the housing.

The inner surface of outer cap member 144 further includes a hole 160. Hole 160 is sized for accepting a spring loaded ball 162 therein (see FIG. 11). Ball 162 is biased by a spring 163. The ball is sized to be partially accepted in recesses 136 and 134 on surface 124 of end member 38. The partial acceptance of the ball 162 into the recesses corresponds to the positions in which the stop finger 158 engages the surfaces 130 and 132 bounding the aperture 128. The spring loaded ball 162 and the recesses 134 and 136 provide detent mechanisms through which the inner shell is releasibly held at its extremes of travel. As a result, the inner shell is held in a position closing the opening to the interior of the area until the detent holding it in that position is overcome. Likewise, the inner shell is held in a position opening the interior area of the carrier housing until the detent mechanism which holds it in that position is overcome.

It will be understood from the foregoing discussion that the construction of the carrier 32 is similar at each of its axial ends. As a result, the inner shell of the carrier may be moved relative to the outer shell either by engagement with outer cap member 144 or outer cap member 146. As will be appreciated however, the direction of rotation of the outer cap member to move the inner shell for example from an open to a closed position, is the opposite on each end of the carrier.

The actuator mechanisms 54 and 82 which operate in the service provider terminal and the customer terminal, respectively, are generally the same in the preferred embodiment of the invention. As a result, only one of the actuator mechanisms is described with reference to FIGS. 19 through 22.

The actuator mechanisms each function to engage the outer cap on the lower end of the carrier when it arrives at the respective station. The actuator mechanism then operates to rotate the carrier so as to align the opening in the outer shell with the adjacent transfer opening in the transfer conduit. The actuator mechanism of the preferred embodiment then holds the housing of the carrier in the aligned position and rotates the outer cap relative to the housing to move the inner shell relative to the outer shell. The inner shell is moved until the openings in the inner and outer shells are aligned and the interior area of the carrier may be accessed. After the interior area is accessed (and items are placed therein or removed therefrom) and before the carrier is moved to the other station, the actuator mechanism further operates to close the carrier by moving the inner shell relative to the outer shell so that the interior area is no longer accessible.

Figure 19:
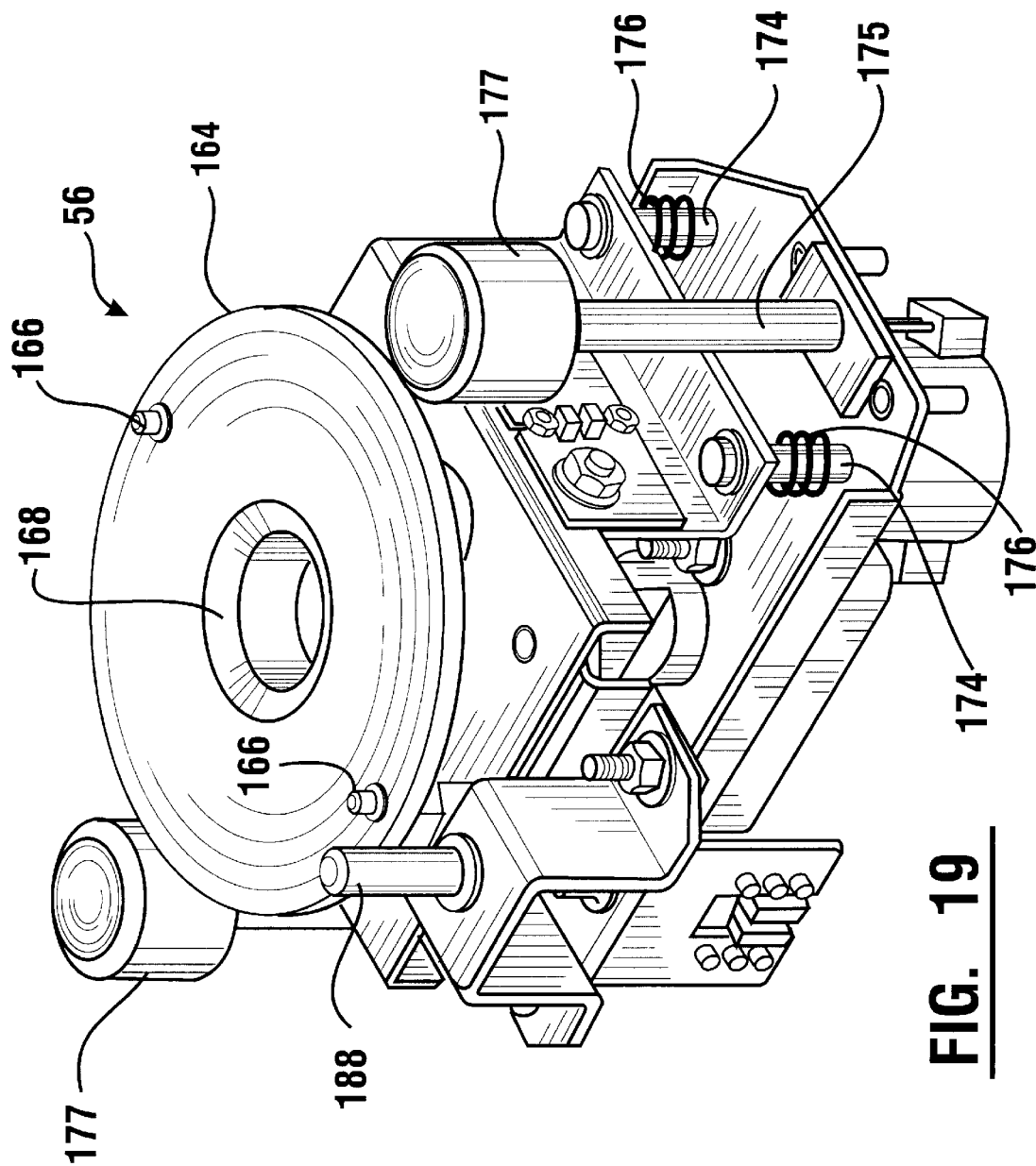
FIG. 19 is an isometric view of the mechanical components of an actuator mechanism used in the service provider terminal and customer terminal.
Figure 20:
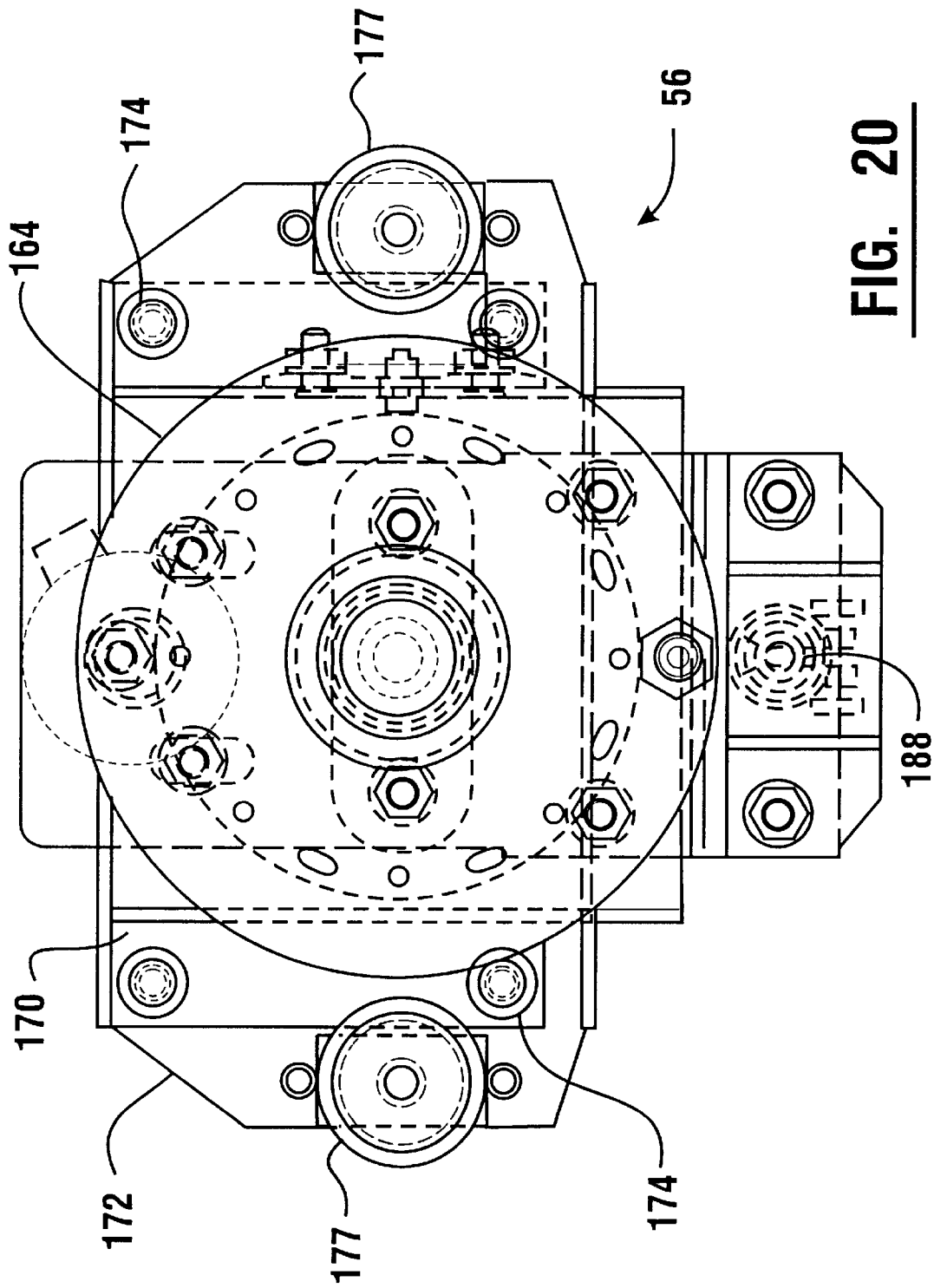
FIG. 20 is a top plan view of the actuator mechanism shown in FIG. 19.

Actuator mechanism 56 is representative of both actuator mechanisms used in the preferred embodiment. As shown in FIG. 19, the actuator mechanism includes a rotating member 164. The rotating member 164 includes a pair of diametrically disposed spring loaded pins 166 mounted thereon. The upper movable portions of pins 166 are operative to engage the projections 148 on the outer caps so as to provide positive engagement for rotating the outer cap. Rotating member 164 further includes a central opening 168. Opening 168 is sized so that the hub areas 150 on the end caps of the carrier may be accepted therein.

Rotating member 164 is mounted for rotation and supported on a bracket 170. Bracket 170 is floatably mounted to a base 172. Base 172 in tarn is mounted to a member which extends in the transfer conduit. The floatable mounting of bracket 170 is accomplished by enabling bracket 170 to move relative to base 172 on four guides 174. Bracket 170 is biased towards the upper extreme of its travel on the guides by springs 176. The floatable mounting of rotating member 164 enables the actuator mechanism to absorb shocks and to function reliably despite repeated impacts with the carrier 32. Shock absorbing bumpers 177 which are supported on pins 175 which extend from base 172 further help absorb impacts. The tops of bumpers 177 are positioned so that they engage the outer cap of a carrier when the springs are deformed beyond a set amount due to the force of a landing carrier.

Figure 21:
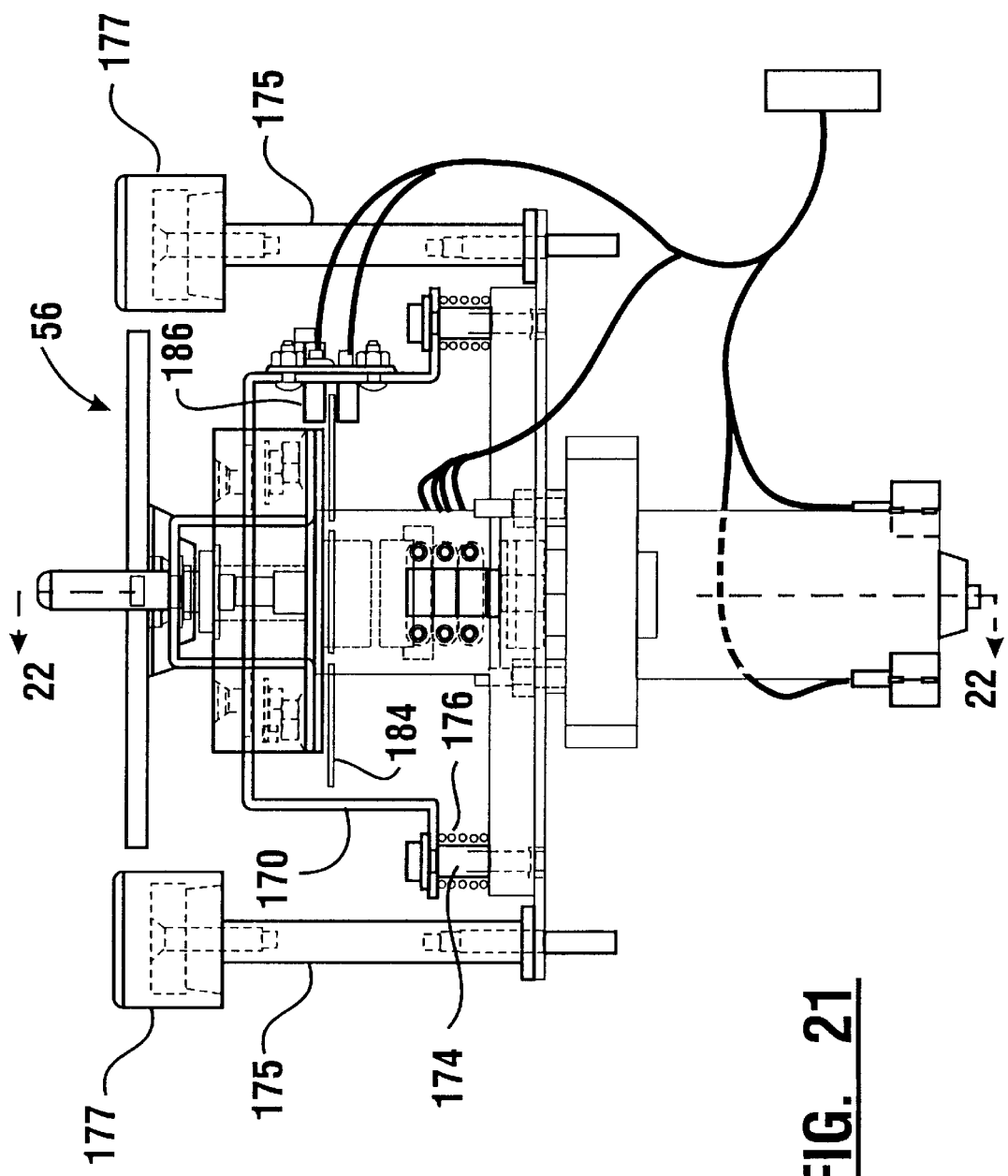
FIG. 21 is a side view of the actuator mechanism.
Figure 22:
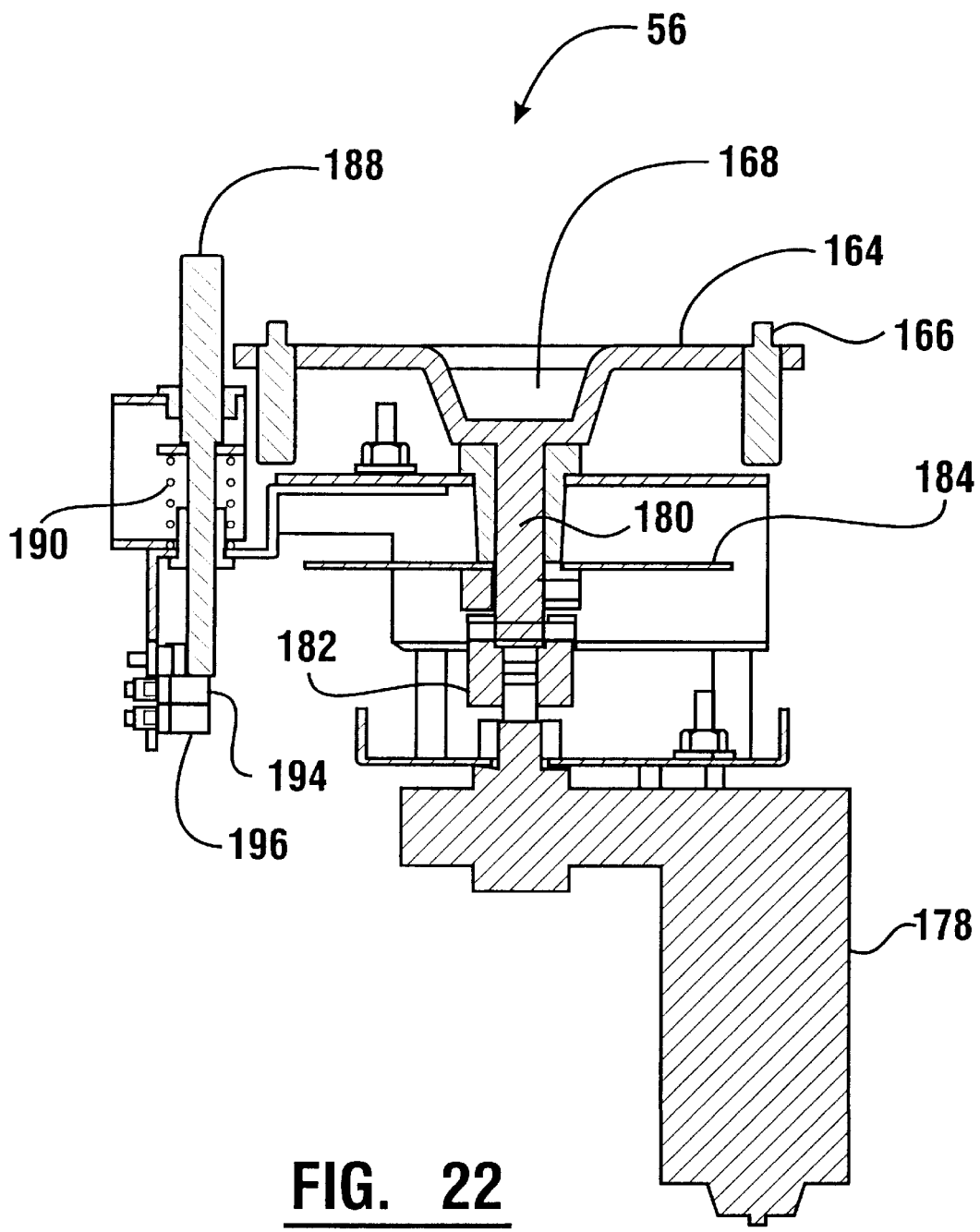
FIG. 22 is a side cross sectional view taken along line 22—22 in FIG. 21.
Figure 23:
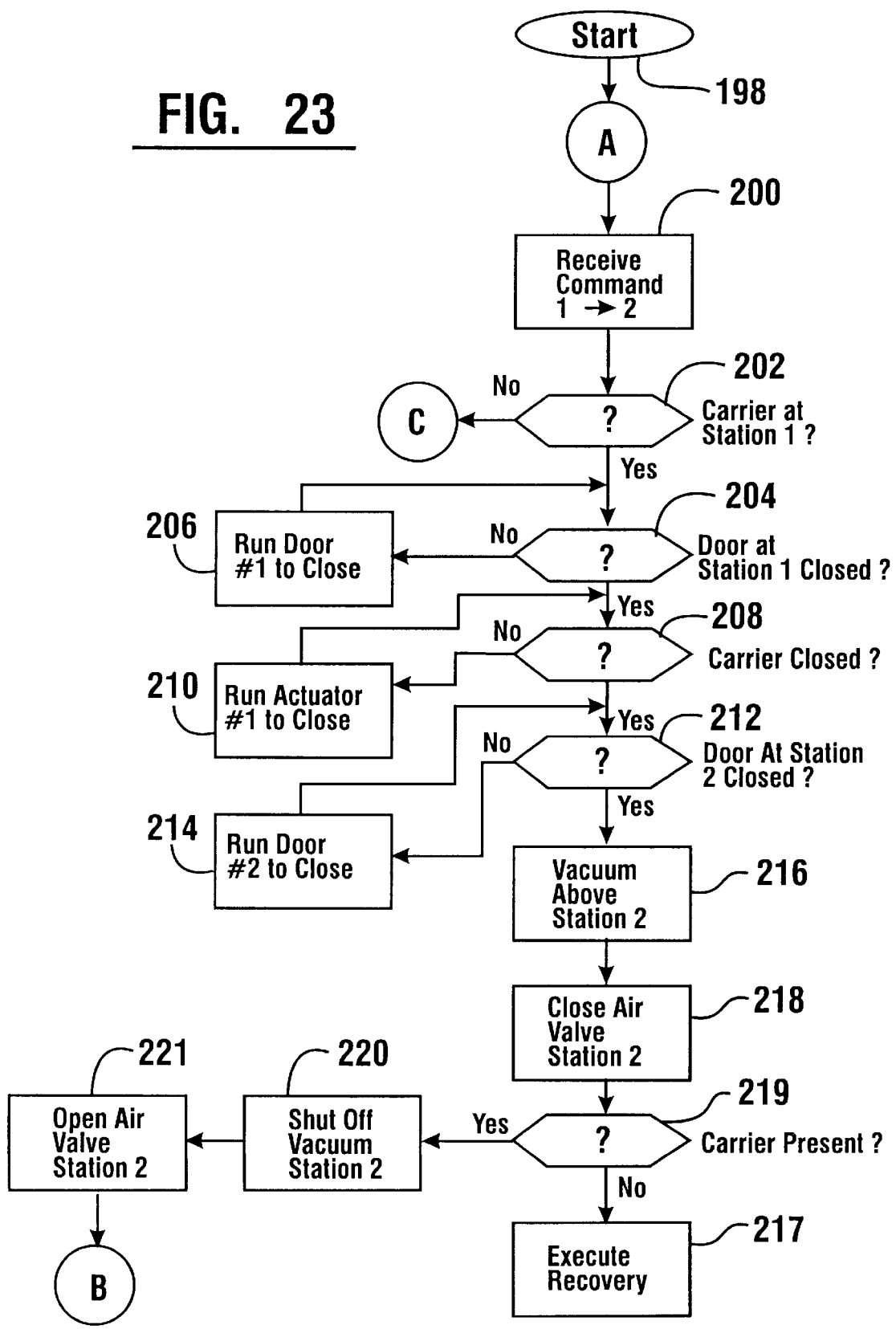
FIGS. 23–26 show a schematic of the logic flow used by the control system of the preferred embodiment of the pneumatic transfer apparatus.
Figure 24:
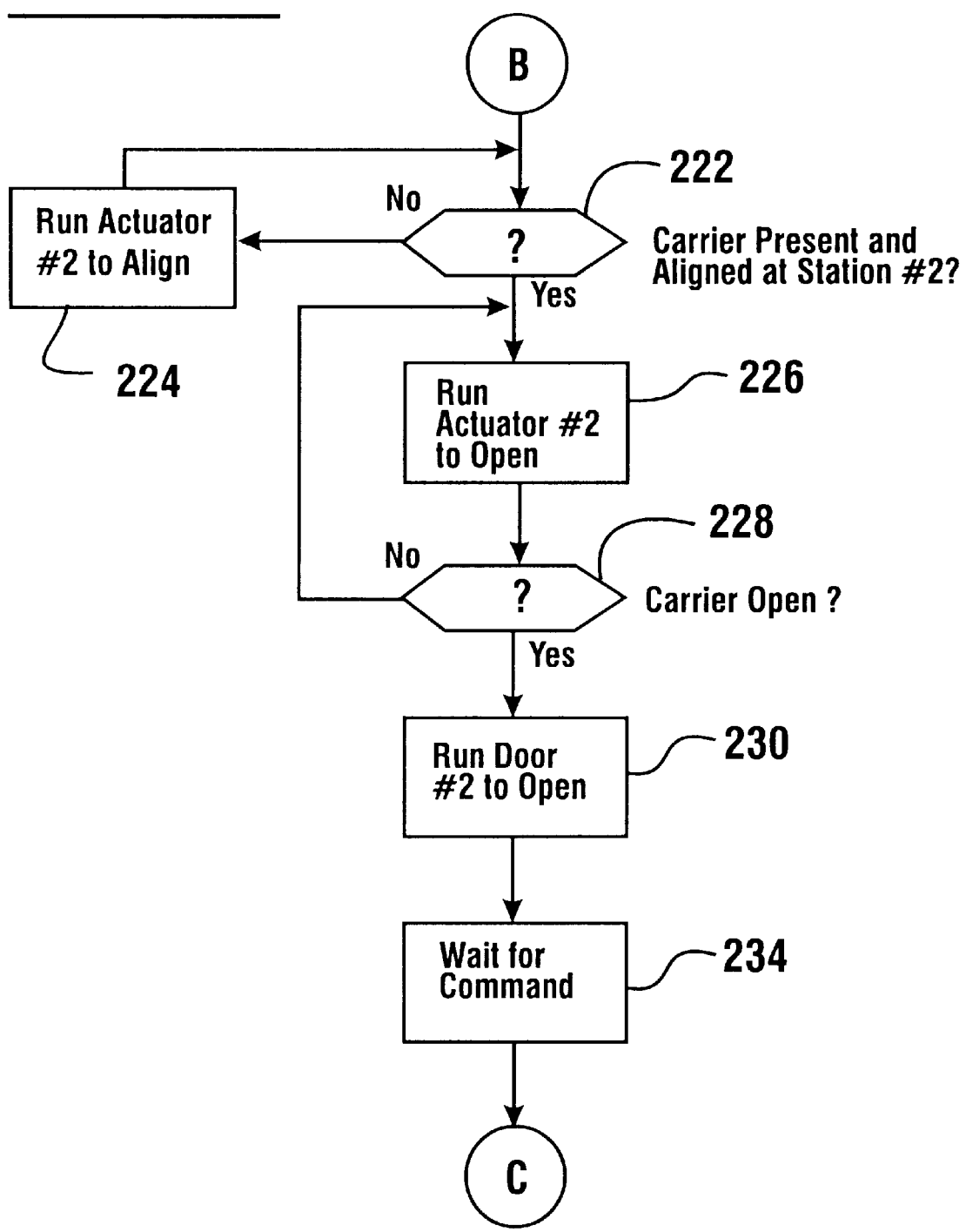
Figure 25:
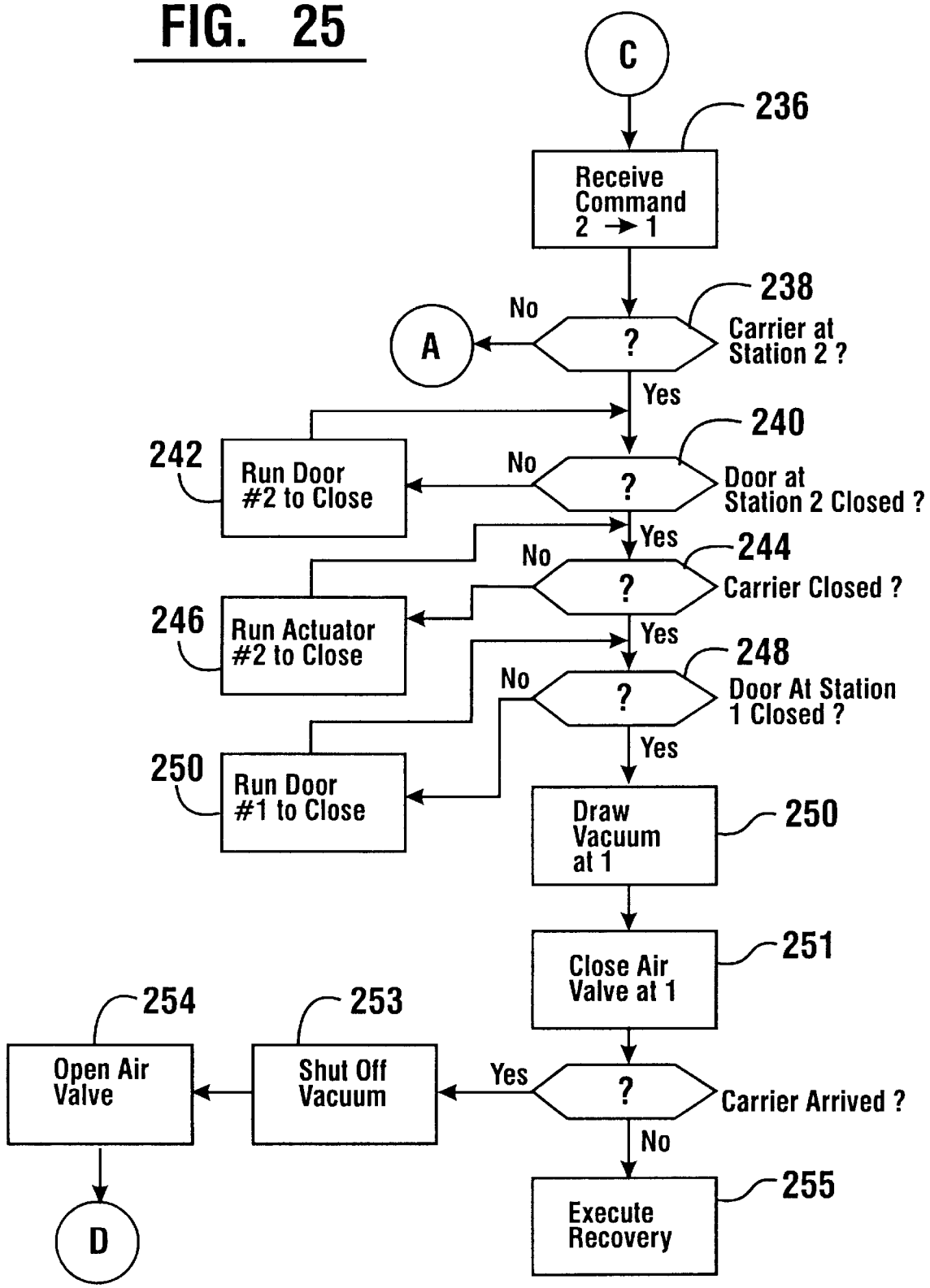
Figure 26:
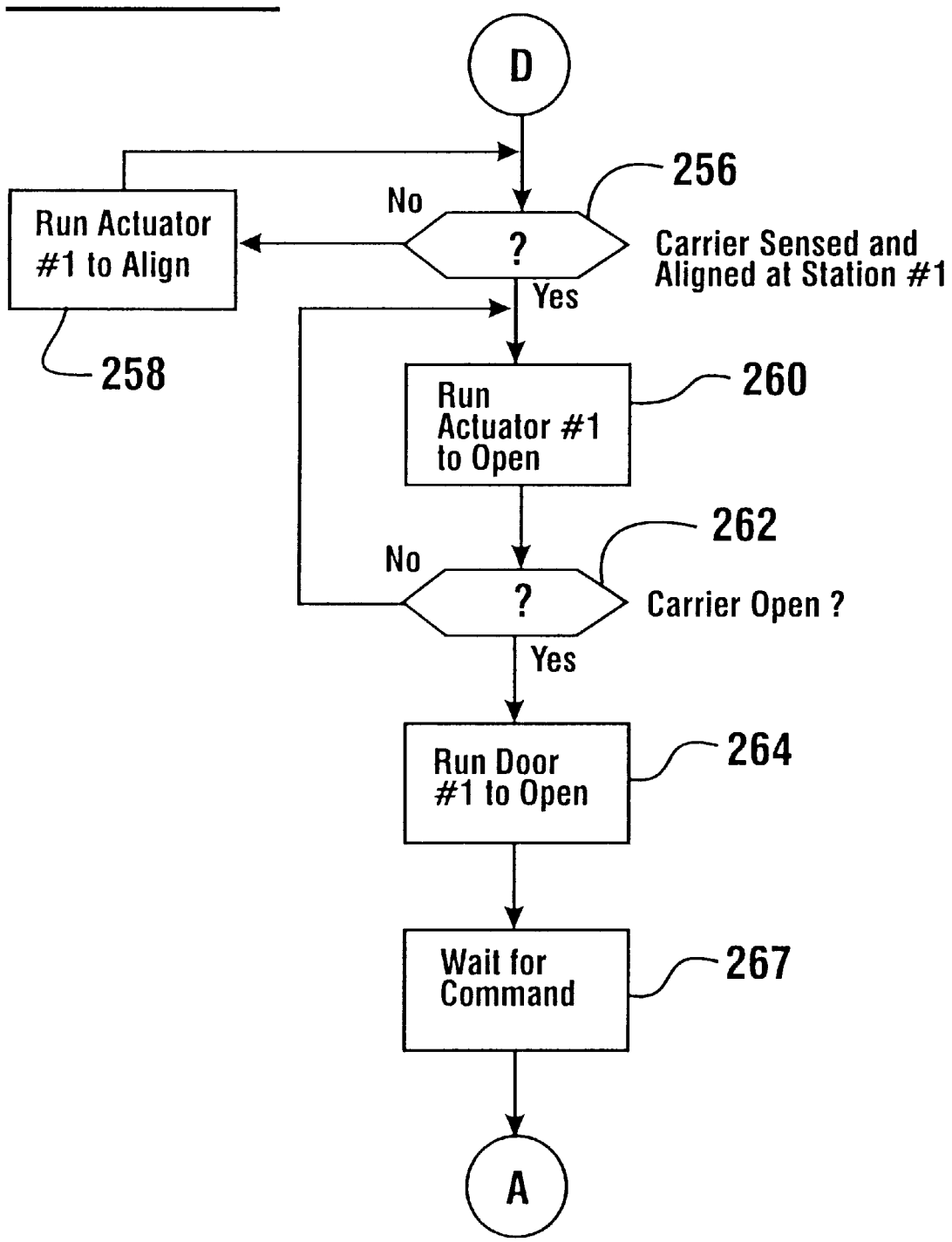

As shown in FIGS. 21 and 22, rotating member 164 is operatively connected to a motor 178. Motor 178 is connected to the rotating member through a shaft 180 and a two piece coupling 182 which tolerates axial deformation to prevent damage to motor 178. A circular encoder member 184 is mounted on shaft 180. An encoder sensor 186 is mounted on bracket 170 adjacent to the encoder. The encoder and sensor, which in the preferred embodiment of the invention are of the optical-type, enable the control circuitry 90 to determine the extent of rotation of the rotating member 164. This is used by the control circuitry to open and close the carrier in a manner later discussed.

Radially outward beyond the periphery of rotating member 164, a projecting member 188 is positioned. The position of projecting member 188 is angularly fixed relative to the transfer conduit and is positioned in predetermined relationship relative to the adjacent transfer opening through the transfer conduit. As best shown in FIG. 22, projection member 188 is movably mounted so as to be movable in a generally vertical direction responsive to contact with the end member 36 of the carrier. A spring 190 operates to bias projecting member 188 towards the fully upward position shown in FIG. 22. The lower end of projecting member 188 is movable adjacent to two sensors 194 and 196. By sensing the position of the lower end of projecting member 188, the control circuitry is enabled to determine the orientation of the carrier.

In the preferred embodiment projecting member 188 is positioned so that when an outer cap of the carrier, such as outer cap 38, is engaged with the rotating member 164, the projecting member is engageable with the annular projection 120. As a result, when the carrier has arrived at the actuator mechanism and if the recess 122 in the annular projection has not by chance landed such that the projecting member extends therein, the lower end of the projecting member will move downward and will be sensed by sensors 194 and 196. This informs the control circuitry that the carrier has arrived at the actuator mechanism, but that the opening of the carrier is not angularly aligned with the transfer opening through the transfer tube.

Rotation of the rotating member 164 by the control circuitry causes projecting member 188 to ride on the annular projection 120 in cam-like fashion until the recess 122 is reached. Recess 122 serves as an indicator that the carrier is oriented in a desired angular position. Once the projecting member 188 is aligned with the recess 122, the projecting member moves upward. In this position the lower end of the projecting member is sensed by sensor 194. When the projecting member 188 is engaged in the recess 122, the opening in the outer shell of the carrier is aligned with the transfer opening. Further, the engagement of the projecting member in the recess serves to hold the end member in a fixed angular position.

It should be understood that while in the embodiment shown the projection is operatively connected to the actuator mechanism and the recess is operatively connected to the carrier, in other embodiments these features may be reversed.

Once the outer shell of the carrier has been positioned so that the opening through the outer shell is aligned with the transfer opening through which the service provider or customer may access the interior area of the carrier, the rotating member operates to rotate the outer cap relative to the end member. The outer cap is rotated so that the inner shell is rotated relative to the outer shell until the openings of the inner and outer shell are aligned. In doing this the motor 178 driving the rotating member 164 overcomes the force of the detent mechanism tending to hold the carrier in a closed position. The encoder 184 is used to control the operation of the motor 178 so that the inner shell is rotated relative to the outer shell only to the extent necessary to open the interior area of the carrier. The extent to which the inner shell may be moved relative to the outer shell is also limited by the engagement of the stop finger 158 engaging with the wall surfaces 130 or 132 bounding the aperture 128 in the end member.

In one preferred form of the invention, the rotating member 164 operates to orient the carrier by rotating it in the transfer conduit. The direction of rotation for orienting the carrier is preferably the same direction that the inner shell rotates to close the opening in the carrier. In this way the carrier is oriented using a force which tends to maintain the carrier in a closed position. Once the carrier has reached the desired orientation as sensed by the movement of the projecting member 188, the control circuitry preferably operates to move the rotating member 168 in an opposed rotational direction so as to open the carrier. In alternative embodiments the direction in which the rotating member 164 turns to orient the carrier may be the same direction as is used to open the carrier. In such embodiments the control circuitry operates to rotate the rotating member through a defined angular displacement after the carrier is sensed in the desired orientation through movement of the projecting member 188. In such alternative embodiments the force of the detent mechanism holding the carrier in the closed position is relied upon to prevent the carrier from opening prematurely.

In one preferred form of the invention the actuator mechanism 82 at the customer terminal engages an outer cap at an opposed end of the carrier from the actuator member 56 at the service provider terminal. As a result, the described form of the invention is operated so that the motors on the respective actuators operate in opposed directions when orienting and opening the carrier.

It should be further appreciated that the described form of the rotating member 164 has spring loaded pins 166 supported thereon. The pins enable depressing the portions of the pins which extend above the top surface of the rotating member when a projection on the outer cap lands thereon. When the rotating member 164 begins to rotate, the movement of the rotating member relative to the carrier causes the pins to extend and engage a subsequent projection. In other embodiments of the invention other devices may be used to accomplish this function such as solid or resilient projections, ratchet type mechanisms, limited slip pads or finger members.

A simplified schematic of the logic flow executed by the control circuitry of a preferred form of the invention is shown with reference to FIGS. 23 through 26. The schematic begins from a start point 198 in which the system is preferably turned on and initialized so as to enable the system to operate in a run mode. The system receives a command at a step 200. For purposes of this example it will be presumed that the command received at step 200 is a command to move the carrier from station 1, which in this example is the service provider terminal 22, to station 2 which in this example is the customer terminal 24. This command is input in the preferred embodiment through the service provider entering a command on the control panel 46 of the service provider terminal.

After receiving the command at step 200 to move the carrier from station 1 to station 2, a step 202 is executed. In step 202 a decision is made as to whether the carrier is present at station 1. This decision is made by the control circuitry based on the position of the projecting member on the actuator mechanism. If the projecting member senses that the carrier is positioned at station 1, a step 204 is executed. In step 204 a check is made as to whether the door 50 at the service provider terminal is closed. If not, the door closing mechanism is run at a step 206 until the door is closed.

At a step 208 a check is then made to see if the carrier is closed. If the carrier is not closed a step 210 is executed in which the actuator mechanism is operated to rotate the inner shell relative to the outer shell of the carrier to close the interior area of the carrier. This is accomplished by movement of the rotating member 164 a predetermined angular distance as sensed by the encoder member which rotates in correspondence with the rotating member.

Once the carrier is closed a check is made at a step 212 concerning whether the door at the customer terminal 24 to which the carrier will be traveling is closed. In the described embodiment it is necessary to have the door closed at the terminal to which the carrier will be traveling so as to maintain the air pocket which serves as a cushion for landing the carrier. If the door at the customer station is not closed, a step 214 is executed in which the door actuating mechanism at the customer terminal operates to close the door.

It should be understood that in each of the steps in which various components are operated, control circuitry may include timing routines so as to provide a fault indication if the desired function is not accomplished within a set time period. Likewise, embodiments of the invention may include error recovery-type routines so that desired functions may be retried in the event of an initial failure. Such timing and error recovery routines is not included in the described logic flow so as to facilitate understanding of the primary functions executed by the control circuitry.

After the carrier has been closed and the doors of both the service provider terminal and the customer terminal are closed, blower 28 is activated at a step 216 and air valve mechanism 84 at the customer station is closed at a step 218. Blower 28 operates to draw a vacuum in the transfer conduit in the area above customer terminal 24. The negative pressure above the carrier causes the carrier to move upward through leg portion 23 of the transfer conduit. The carrier moves through the transverse portion 27 of the transfer conduit until the carrier is positioned above customer terminal 24. The carrier is enabled to move because air at atmospheric pressure rapidly enters the transfer conduit through the air valve mechanism 56 in the service provider terminal which is normally biased open.

Once the carrier passes the area of the conduit where blower 28 is connected thereto, the carrier descends on a cushion of air in the air pocket between the closed valve mechanism 84 and the carrier. The rate of air flow past the accelerator rings on the carrier controls the rate of descent. Air valve mechanism 84 is maintained closed as the carrier descends at the customer station, the air valve mechanism being held closed by a solenoid in operative connection with the control circuitry.

At a step 219 a check is made as to whether the carrier is present at the customer station. If so the blower above the customer terminal is shut off at a step 220 and the air valve at the customer station is opened at a step 221. If at step 219 the carrier is not sensed, a recovery routine is executed at a step 217. In one preferred embodiment the controller in the control circuitry is programmed to execute a timing function. Each time a carrier is launched from one terminal to the other a check is made to determine if thirty seconds later the carrier is sensed as having arrived at the other terminal. If in the step 219 the carrier is not sensed at the customer terminal thirty seconds after the blower 28 is turned on, the blower is turned off by the recovery routine in step 217. The recovery routine then attempts to bring the carrier back to the service provider terminal by operating blower 30 for thirty seconds. If the blower is not sensed as returned to the service provider terminal by that time, blower 30 is shut off and blower 28 is again operated for a thirty second period. This process is repeated until the carrier is sensed as having moved to one of the terminals or until a preset number of cycles has been executed at which point the blowers are both shut off and an error indication is given by the control circuitry. In the described embodiment the error recovery routine is generally the same regardless of whether the carrier is traveling from the service provider terminal to the customer terminal or vice versa.

At a step 222 a check is made concerning whether the carrier which has arrived at the customer station is aligned with the transfer opening 76. This decision is based on the position of the projecting member 188 on the actuator mechanism. If the carrier is present but not aligned as is usually the case upon arrival, the actuator member is run at a step 224 to rotate the carrier relative to the transfer conduit. The carrier is rotated by rotating the outer cap in engagement with the rotating member of the actuator mechanism until the projecting member is engaged in the recess on an end member of the carrier. The engagement of the projecting member in the recess serves to hold the carrier in a desired angular position with the opening in the outer shell aligned with the transfer opening 76.

Once the opening in the outer shell of the carrier is aligned, the actuator mechanism is operated at a step 226 to move the inner shell of the carrier relative to the outer shell. The inner shell is moved relative to the outer shell until the openings in the inner and outer shells are aligned and the interior area of the carrier is accessible. This decision is based on the rotation of the encoder member in the actuator mechanism and is graphically represented by a step 228.

Once the interior area of the carrier is accessible, the door actuating mechanism 80 at the customer terminal is operated so as to open door 78. This is done at a step 230. The door moves until the door 78 is fully open. Once door 78 is open the customer is enabled to access and remove the items that have been transported in the interior area of the carrier. The customer is also enabled to insert items into the carrier for transfer to the service provider. While this is occurring the system waits at a step 234. The system will wait in this condition until a command is given to transfer the carrier from the customer terminal to the service provider terminal.

The command to transfer the carrier from the customer terminal to the service provider terminal is shown input at a step 236. Such command may be entered either from the control panel 74 on the customer terminal or the control panel 46 on the service provider terminal. A check is then made at a step 238 that the carrier is at station 2. Assuming for purposes of this example that the carrier is at station 2, a step 240 is next executed to check if the door 78 at station 2 is closed, and if not, a step 242 is executed to close the door.

Once the door 78 of the customer terminal is closed, a check is next made at a step 244 concerning whether the carrier is closed. The decision is based on information held in the memory of the control circuitry or alternatively may be sensed based on sensors in the customer terminal. A step 246 is then executed in which the actuator mechanism moves the inner shell relative to the outer shell of the carrier so as to close the interior area.

Once the carrier is closed a check is then made at a step 248 concerning whether the door at the service provider terminal is closed. If the door is not closed, a step 250 is carried out so as to close the door at the service provider terminal.

The electrical circuits in the control circuitry then operate to activate blower 30 so as to draw a vacuum above the service provider terminal 22. This is done at a step 250. The carrier moves upward from the customer terminal 24 in response to the vacuum being drawn above the service provider terminal as air rushes in behind the carrier through the open air valve mechanism 84. The air valve at the service provider station is closed at a step 251. Upon reaching the conduit above the service provider terminal the carrier falls downward to the service provider terminal based on the controlled air flow past the accelerator rings on the carrier. A check is made at a step 252 concerning whether the carrier has arrived. If so the vacuum is discontinued at a step 253 and the air valve is opened at a step 254. If the carrier has not been sensed at the service provider terminal thirty seconds after launch, a recovery routine similar to that previously described is executed at a step 255.

If the carrier is timely sensed in step 252 a check is then made at a step 256 as to whether the carrier has landed with the opening in the outer shell in aligned relation with the transfer opening 48. If the carrier has not landed in aligned relation, the actuator mechanism is operated at a step 258 to turn the carrier until the opening in the outer shell is aligned with the transfer opening.

Once the opening in the outer shell is aligned with the transfer opening 48, the actuator mechanism is operated at a step 260 to move the inner shell relative to the outer shell so as to open the interior area of the carrier. The actuator mechanism operates until the necessary angular movement has been accomplished as verified in a step 262. The necessary angular movement of the outer cap member is accomplished based on the degree of angular rotation sensed by the encoder member which is operatively connected to the rotating member of the actuator mechanism. At a step 264, the door actuating mechanism 52 is operated until door 50 is open. Once this is accomplished the service provider is enabled to access the interior area of the carrier so as to place items therein or to remove items therefrom. The control logic of the circuit continues in a wait state at a step 267 until a command is again given to transfer the carrier from the service provider terminal to the customer terminal.

As will be appreciated, the orientation of the items in the carrier when it is delivered at the customer terminal is vertically reversed from that at the service provider terminal. As a result, various compartments and holding devices may be provided within the interior area of the inner shell so as to hold the transported items in a desired orientation. Such mechanisms may include clips or various types of subcompartments within the interior area of the inner shell. Alternatively, inflatable air bladders or other mechanisms suitable for holding the items in a desired position may be used in various embodiments of the invention.

The preferred form of the present invention enables the transport of larger and heavier items than is achieved through the use of conventional pneumatic tube conveyor systems. Despite the fact that the system has increased capacity, the differential pressure generating mechanism needed to transfer the carrier between the respective stations is compact and economical. Further, the preferred form of the present invention avoids the need for the service provider and customer to handle and manipulate the carrier. This simplifies operation of the system.

An advantage of the described embodiment is that the actuator mechanism used for opening and closing the carrier may be used with conduits and carriers of various diameters. This enables the transfer conduit and carrier to be tailored to the particular transaction application without having to make extensive modifications to the actuator mechanisms or the control circuitry. Of course embodiments of the invention may be produced where different types of actuator mechanisms and carrier designs are used.

Thus, the new pneumatic transfer apparatus of the present invention achieves the above-stated objectives, eliminates difficulties encountered in the use of prior devices, solves problems and attains the desirable results described herein.

In the foregoing description certain terms have been used for brevity, clarity and understanding. However, no unnecessary limitations are to be implied therefrom because such terms are for descriptive purposes and are intended to be broadly construed. Moreover, the descriptions and illustrations given herein are by way of examples and the invention is not limited to the exact details shown or described. In addition, any feature of the invention that is described in the following claims as a means for performing a function shall be construed as encompassing any means capable of performing the recited function and shall not be deemed limited to the means disclosed in the foregoing description or mere equivalents thereof.

Having described the features, discoveries and principles of the invention, the manner in which it is constructed, utilized and operated, and the advantages and useful results attained, the new and useful structures, devices, elements, arrangements, parts, combinations, systems, equipment, operations, methods and relationships are set forth in the appended claims.

We claim:

1. An apparatus comprising:

a transfer conduit;

a differential pressure generating mechanism operatively connected to the transfer conduit;

a carrier, wherein the carrier has a first axial end and a second opposed axial end disposed from one another in an axial direction, wherein the carrier has a central axis in the axial direction, wherein the carrier is movable in the transfer conduit responsive to differential pressure produced by the differential pressure generating mechanism, wherein the carrier includes a housing bounding an interior area, and wherein the housing includes an opening therethrough and a movable member movably mounted in supporting connection with the housing, and wherein the movable member is rotatably movable relative to the central axis between a closing position in which the movable member closes the opening and an open position wherein the movable member is moved to enable accessing the interior area through the opening;

an actuator mechanism wherein the actuator mechanism operatively engages the movable member and selectively moves the movable member between the open and closing positions.

2. The apparatus according to claim 1 wherein the actuator mechanism operatively engages the movable member when the carrier is in the transfer conduit.

3. The apparatus according to claim 2 wherein the actuator mechanism is positioned within the transfer conduit.

4. The apparatus according to claim 1 wherein the actuator mechanism comprises a rotating member, and wherein the rotating member operatively moves the movable member.

5. The apparatus according to claim 1 wherein the transfer conduit includes a transfer opening, and further comprising an orienting mechanism, wherein the orienting mechanism is operative to align the transfer opening and the housing opening.

6. The apparatus according to claim 5 wherein the orienting mechanism includes a rotating member, wherein the rotating member operatively engages the carrier housing and moves the carrier to a selected angular position.

7. The apparatus according to claim 6 wherein the carrier includes an end member, wherein the end member includes an indicator in operative connection therewith, and wherein the orienting mechanism includes a sensor, wherein the sensor senses the position of the indicator.

8. The apparatus according to claim 7 wherein the orienting mechanism includes an interengaging projection and recess, one of the projection or the recess being in operative connection with the end member and the other one of the projection or the recess being in operative connection with the sensor, and wherein when the projection and recess engage further rotational movement of the carrier relative to the transfer conduit is prevented.

9. The apparatus according to claim 5 wherein the actuator mechanism includes a holding mechanism, wherein the holding mechanism holds the transfer and housing openings in alignment as the actuator mechanism moves the movable member.

10. The apparatus according to claim 9 wherein the carrier includes an end member in operative connection with the housing, and wherein the end member includes one of either an interengaging projection or recess, and wherein the other of the projection or recess is connected in a fixed angular position relative to the transfer conduit, and wherein the orienting mechanism includes a rotating member, wherein the rotating member is operative to rotate the carrier housing relative to the transfer conduit until the projection and recess are in engagement, wherein upon engagement further relative rotational movement of the carrier housing is stopped and the transfer opening and the housing opening are in alignment.

11. The apparatus according to claim 10 wherein the carrier includes an outer cap member, wherein the cap member is rotationally movable relative to the end member, and wherein the outer cap member is in operative connection with the movable member, and wherein the rotating member is in operative connection with the outer cap member, wherein angular movement of the outer cap member is operative to move the carrier housing relative to the transfer conduit until the projection and recess are engaged, and subsequent to such engagement subsequent movement of the outer cap member is operative to move the movable member.

12. The apparatus according to claim 11 and further comprising a closing detent mechanism in operative connection between the end member and outer cap member, wherein the closing detent mechanism is operative to hold the movable member in the closing position.

13. The apparatus according to claim 11 and further comprising an open detent mechanism in operative connection between the end member and the outer cap member, wherein the open detent mechanism is operative to hold the movable member in the open position.

14. The apparatus according to claim 11 wherein the end member includes one of either a stop finger or a stop aperture, and the outer cap member includes the other of the stop finger or the stop aperture, wherein the stop aperture is bounded by an aperture wall and wherein the finger extends in the stop aperture and engages the aperture wall when the movable member is in the open position, wherein movement of the movable member substantially beyond the open position is prevented.

15. The apparatus according to claim 14 wherein the stop finger engages the aperture wall in the closing position of the movable member, and wherein as the movable member moves in a closing direction substantially from the open position to the closing position further movement of the movable member in the closing direction substantially beyond the closing position is prevented.

16. The apparatus according to claim 11 wherein the housing includes an outer shell in operatively fixed relation with the end member, and wherein the outer shell includes a generally arcuate member in transverse cross section, and wherein the movable member is generally arcuate in transverse cross section.

17. The apparatus according to claim 16 wherein the outer shell includes a first generally cylindrical member, and wherein the movable member includes an inner shell having a second generally cylindrical member positioned in telescoping relation within the first cylindrical member, and wherein movement between the open and closing positions includes relative rotational movement of the first and second cylindrical members.

18. The apparatus according to claim 17 wherein the carrier includes an inner cap member, and wherein the inner cap member is in supporting connection with the second cylindrical member and is angularly movable relative to the end member, and wherein the inner cap member is operatively connected to the outer cap member by a shaft member journaled in supporting connection with the carrier.

19. The apparatus according to claim I wherein the carrier includes an outer cap member movably mounted in supporting connection with the carrier housing, and wherein the outer cap member is in operative connection with the movable member, and further comprising a releasible engaging mechanism, wherein the releasible engaging mechanism releasibly operatively engages the housing and the outer cap member, wherein when the outer cap member and the housing are operatively engaged movement of the outer cap member is operative to move the housing relative to the transfer conduit, and wherein when the engaging member disengages the housing and the outer cap member, movement of the outer cap member is operative to move the movable member relative to the housing.

20. The apparatus according to claim I wherein the carrier includes a pair of longitudinally disposed ends, and wherein the carrier further includes a pair of movable cap members, each movable cap member movably mounted in supporting connection with the carrier housing at one of the longitudinally disposed ends, and wherein each cap member is in operative connection with the movable member.

21. The apparatus according to claim 20 wherein the actuator mechanism operatively engages one of the cap members to move the movable member, and further comprising a further actuator mechanism disposed in the transfer conduit from the actuator mechanism, wherein the further actuator mechanism is operative to engage the other of the cap members on the carrier and to move the movable member.

22. An apparatus comprising:
a transfer conduit;
a differential pressure generating mechanism operatively connected to the transfer conduit;
a carrier, wherein the carrier is movable in the transfer conduit responsive to differential pressure produced by the differential pressure generating mechanism, wherein the carrier includes a housing bounding an interior area, and wherein the housing includes an opening therethrough and a movable member movably mounted in supporting connection with the housing, and wherein the movable member is movable between a closing position in which the movable member closes the opening and an open position wherein the movable member is moved to enable accessing the interior area through the opening;
actuator mechanism wherein the actuator mechanism operatively engages the movable member and selectively moves the movable member between the open and closing positions, wherein the actuator mechanism includes a floatably mounted rotating member, wherein rotation of the rotating member is operative to move the movable member, and wherein the carrier is operatively supported on the floatably mounted rotating member as the movable member is moved between the open and closing positions.

23. The apparatus according to claim 1 wherein the transfer conduit comprises a transfer opening, and further comprising a sensor and a control circuit in operative connection with the actuator mechanism, wherein the sensor is operative to sense alignment of the housing opening and the transfer opening and to enable the actuator mechanism to move the movable member to the open position responsive to the housing and transfer opening being in alignment.

24. The apparatus according to claim 23 wherein the sensor and control circuit are operative to move the movable member relative to the carrier housing responsive to the transfer opening and the housing opening being in angular alignment.

25. An apparatus comprising:
the carrier member including at least one annular seal, wherein the seal enables generally fluid tight, slidable engagement with a generally surrounding transfer conduit when the carrier is positioned in the transfer conduit, whereby the carrier is enabled to be moved in the conduit by differential pressure, and wherein the seal extends in centered relation about an axis, and wherein the carrier has a first axial end and a second opposed axial end disposed from one another in an axial direction;
the carrier including a housing, wherein the housing is disposed radially inward relative to a maximum diameter of the annular seal, and wherein the housing generally bounds an interior area, and wherein the housing includes an opening, wherein the interior area is accessible through the opening;
a movable member movably mounted on the carrier, wherein the movable member is movable relative to the housing, wherein the movable member is movable between a closed position wherein the movable member closes the opening and an open position wherein the movable member enables access to the interior area through the opening;
an outer cap member, wherein the outer cap member is movably mounted on the carrier relative to the housing adjacent the first axial end, and wherein the outer cap member is accessible from an exterior area of the housing, and wherein the outer cap member is in operative connection with the movable member, wherein movement of the outer cap member relative to the housing is operative to move the movable member between the open and closed positions.

26. The apparatus according to claim 25 and further comprising a mechanism, wherein the mechanism is operative to rotate the carrier housing to place the opening in a predetermined angular position and to move the movable member relative to the housing, wherein the movable member is moved between the open and closed positions.

27. The apparatus according to claim 26 wherein the mechanism is further operative to hold the carrier housing in the predetermined angular position after the carrier is rotated to the predetermined angular position.

28. The apparatus according to claim 25 wherein the outer cap member is rotatably mounted on the carrier, and wherein the outer cap member rotates about the axis to move the movable member between the open and closed positions, and wherein the carrier further comprises an annular projection, wherein the annular projection is mounted in a fixed angular position relative to the housing, and wherein the annular projection extends in generally concentric relation relative to the axis, and wherein the annular projection includes at least one recess, and wherein the recess has a predetermined angular relationship relative to the opening.

29. The apparatus according to claim 28 and further comprising a mechanism, wherein the mechanism comprises a rotating member and a projection, wherein the projection extends in generally the axial direction, and wherein the rotating member is operative to rotate the outer cap member, and wherein the carrier is rotated by the outer cap member until the projection engages the recess in the annular projection, and thereafter the mechanism is operative to rotate the rotating member wherein the movable member is moved between the open and closed positions.

30. The apparatus according to claim 29 and further comprising a motor in operative connection with the rotating member, a sensor, and a control circuit in operative connection with the sensor and the motor, and wherein the sensor is movably mounted relative to the rotating member in generally the axial direction, and wherein the sensor is in operative connection with the projection, and wherein the projection is in a second axial position when the carrier is adjacent the rotating member and the recess in the annular projection is angularly disposed from the projection, and a first axial position when the projection is engaged in the recess, and wherein the control circuit is operative responsive to the projection moving to the second axial position to operate the motor to move the rotating member until the projection moves to the first axial position, and thereafter responsive to movement of the projection to the first position the control circuit is operative to run the motor to move the outer cap member relative to the housing to move the movable member between the open and closed positions.

31. The apparatus according to claim 25 wherein the carrier further includes a further outer cap member, wherein the further outer cap member is movably mounted on the carrier relative to the housing, and wherein the further outer cap member is positioned adjacent the second axial end of the carrier and is accessible from the exterior area of the housing, and wherein the further outer cap member is in operative connection with the movable member, wherein movement of the further outer cap member relative to the housing is operative to move the movable member between the open and closed positions.

32. The apparatus according to claim 31 and further comprising a transfer conduit, wherein the transfer conduit comprises a first generally vertically extending leg portion having a first transfer opening therein, and a second generally vertically extending leg portion having a second transfer opening therein, and a transverse conduit portion in operative connection with the first and second leg portions, and wherein said apparatus further comprises:
  a first mechanism positioned generally vertically below the first transfer opening in the first leg portion;
  a second mechanism positioned generally vertically below the second transfer opening in the second leg portion;
  a differential pressure generating mechanism in operative connection with the transfer conduit, wherein the differential pressure generating mechanism enables selectively moving the carrier between the first leg portion and the second leg portion;
  and wherein the first mechanism is operative when the carrier is positioned in the first leg portion to operatively engage the outer cap member and to open the housing opening in aligned relation with the first transfer opening by moving the outer cap member relative to the housing;
  and wherein the second mechanism is operative when the carrier is positioned in the second leg portion to operatively engage the further outer cap member and to open the housing opening in aligned relation with the second transfer opening by moving the further outer cap member relative to the housing.

33. A method comprising the steps of:
  moving items housed in an interior area of a carrier by moving the carrier in a transfer conduit by applying differential pressure on opposed sides of the carrier in the transfer conduit;
  engaging a first end cap of the carrier with a mechanism positioned generally below a first transfer opening in a first generally vertically extending leg portion of the transfer conduit; and
  opening the interior area of the carrier by moving the first end cap relative to the carrier with the mechanism.

34. The method according to claim 33 wherein the carrier has a carrier opening, wherein in the open condition the interior area is accessible through the opening, and prior to the opening step further comprising the step of orienting the housing opening in aligned relation with the first transfer opening in the leg portion by rotating the carrier relative to the leg portion by operative engagement with the mechanism.

35. The method according to claim 33 and further comprising the steps of:
  transferring an article between the interior area of the carrier and an exterior area of the carrier;
  closing the interior area of the carrier by moving the end cap relative to the housing; and
  further moving the carrier through the transfer conduit to a second generally vertically extending leg portion, wherein the second leg portion is disposed in a generally horizontal direction from the first leg portion.

36. The method according to claim 35 wherein the carrier includes a second end cap, wherein the second end cap is disposed at a generally opposed end of the carrier from the first end cap, and further comprising the steps of:
  further engaging the second end cap of the carrier with a further mechanism positioned generally below a further transfer opening in the second leg portion; and
  again opening the interior area of the carrier by moving the second end cap relative to the carrier with the further mechanism.

37. The method according to claim 34 wherein the orienting step comprises rotating the carrier relative to the first leg portion by rotating the first end cap until a projection in operative connection with the mechanism engages a recess on the carrier, wherein in the engaged position of the projection and the recess the housing opening and the transfer opening are in aligned relation, and wherein the opening step comprises further rotating the first end cap after the projection is engaged with the recess, wherein the first end cap is rotated relative to the carrier, and wherein such relative rotation is operative to move a movable member on the carrier to open the carrier opening.

38. An apparatus comprising:

a carrier,
- wherein the carrier is adapted for movement in a transfer conduit responsive to differential pressure,
- wherein the carrier includes a housing,
  - wherein the housing bounds an interior area,
  - wherein the housing includes an opening therethrough,
  - wherein the interior area is accessible through the opening,
  - wherein the housing has a closed position wherein the opening is closed, and an open position wherein the opening is open,
  - wherein the housing includes an outer shell and an inner shell,
  - wherein the outer shell includes a first generally cylindrical member,
  - wherein the inner shell includes a second generally cylindrical member,
  - wherein the second generally cylindrical member is positioned in telescoping relation within the first cylindrical member,
  - wherein the first and second generally cylindrical members are adapted for relative rotational movement,
  - wherein movement between the open and closed positions includes relative rotational movement of the first and second cylindrical members.

39. An apparatus comprising:

a carrier, wherein the carrier has a central axis, wherein the carrier includes at least one seal, wherein the seal enables generally fluid tight, slidable engagement with a generally surrounding transfer conduit when the carrier is positioned in the transfer conduit, whereby the carrier is enabled to be moved in the conduit by differential pressure, wherein the carrier includes a housing bounding an interior area, and wherein the housing includes an opening therethrough and a movable member movably mounted in supporting connection with the housing, wherein the movable member is rotatably movable about the carrier central axis between a closed position in which the movable member closes the opening and an open position wherein the movable member opens the opening to enable accessing the interior area through the opening.

* * * * *